US008990959B2

(12) United States Patent
Zhu et al.

(10) Patent No.: US 8,990,959 B2
(45) Date of Patent: Mar. 24, 2015

(54) MANIPULABLE HUMAN INTERACTIVE PROOFS

(75) Inventors: Bin Benjamin Zhu, Edina, MN (US); Lin Xu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 714 days.

(21) Appl. No.: 12/790,695

(22) Filed: May 28, 2010

(65) Prior Publication Data

US 2011/0292031 A1 Dec. 1, 2011

(51) Int. Cl.
*G06F 21/00* (2013.01)
*G06T 19/20* (2011.01)
*G06F 21/36* (2013.01)

(52) U.S. Cl.
CPC .............. *G06T 19/20* (2013.01); *G06F 21/36* (2013.01); *G06T 2219/2016* (2013.01); *G06F 2221/2133* (2013.01)
USPC ................ 726/29; 726/19; 345/419; 713/182

(58) Field of Classification Search
USPC .............................. 726/29; 713/182; 345/419
See application file for complete search history.

(56) References Cited

U.S. PATENT DOCUMENTS

| 7,337,324 | B2 | 2/2008 | Benaloh et al. |
| 7,533,411 | B2 | 5/2009 | Goodman et al. |
| 7,653,944 | B2 | 1/2010 | Chellapilla et al. |
| 2005/0066201 | A1* | 3/2005 | Goodman et al. ............ 713/202 |
| 2008/0216163 | A1 | 9/2008 | Pratte et al. |
| 2009/0083826 | A1 | 3/2009 | Baribault |
| 2009/0150983 | A1* | 6/2009 | Saxena et al. ...................... 726/7 |
| 2010/0079450 | A1* | 4/2010 | Pizlo et al. .................... 345/419 |
| 2011/0197268 | A1* | 8/2011 | Ravikumar et al. ............... 726/6 |

OTHER PUBLICATIONS

3D Interactive CAPTCHA by Keystroke Level Model, Ince et al Computer Sciences and Convergence Information Technology, 2009. ICCIT '09. Fourth International Conference on Date of Conference: Nov. 24-26, 2009, IEEE.*
"3D CAPTCHA based on the spatial perspective and human imagination" by Juraj Rolko et al cited by disclosure of new type of CAPTCHA technology based on the spatial perspective and human imagination with rotation of a 3D model. (Published on Jan. 10, 2010 on www.3dcaptcha.net .).*
"3D CAPTCHA, a next generation of the CAPTCHA" by Montree Imsamai et al. cited by teaching "3D CAPTCHA" method for enhanced protection from bots. Published in Information Science and Applications (ICISA), 2010 International Conference on Date of Conference: Apr. 21-23, 2010, Dept. of Math., Chulalongkorn Univ., Bangkok, Thailand.*
Phish and hips: Human interactive proofs to detect phishing attacks; R Dhamija and JD Tygar—Human Interactive Proofs, 2005; p. 134-149, U of California, Berkeley.*

(Continued)

*Primary Examiner* — Jason Lee
(74) *Attorney, Agent, or Firm* — Dan Choi; Judy Yee; Micky Minhas

(57) ABSTRACT

A manipulable human interactive proof (HIP) displays at most a portion of verification information. A user performs at least one manipulation on the HIP display to obtain full verification information.

19 Claims, 14 Drawing Sheets

(56) References Cited

OTHER PUBLICATIONS

Baird, Popat, "Human Interactive Proofs and Document Image Analysis", retrieved on Apr. 16, 2010 at <<http://www.springerlink.com/content/g3lg1mvc2l72ltwd/fulltext.pdf?page=1>>, Springer-Verlag Berlin, Lecture Notes in Computer Science, Proceedings of Workshop on Document Analysis Systems (DAS), vol. 2423, 2002, pp. 507-518.

Chellapilla, Larson, Simard, Czerwinski, "Building Segmentation Based Human-friendly Human Interaction Proofs (HIPs)", retrieved on Apr. 16, 2010 at <<http://research.microsoft.com/en-us/um/people/kumarc/pubs/chellapilla_hip05.pdf>>, Springer-Verlag, Proceedings of Workshop on Human Interactive Proofs (HIP), 2005, pp. 1-26.

Chellapilla, Larson, Simard, Czerwinski, "Computers beat Humans at Single Character Recognition in Reading based Human Interaction Proofs (HIPs)", retrieved on Apr. 16, 2010 at <<http://www.ceas.cc/2005/papers/160.pdf>>, Proceedings of Conference on Email and Anti-Spam (CEAS), Jul. 2005, pp. 1-8.

Chellapilla et al, "Designing Human Friendly Human Interaction Proofs (HIPs)", retrieved on Apr. 16, 2010 at <<http://www.google.co.in/url?sa=t&source=web&ct=res&cd=5&ved=0CB4QFjAE&url=http%3A%2F%2Fciteseerx.ist.psu.edu%2Fviewdoc%2Fdownload%3Fdoi%3D10.1.1.117.5191%26rep%3Drep1%26type%3Dpdf&rct=j&q=Designing+Human+Friendly+Human+Interaction+Proofs+(HIPs)&ei=NPDHS8ypGo780wTOpKHXDA&usg=AFQjCNGKdzCR8dgFZHwE1Q06j7L250itFA>>, ACM, Conference on Human Factors in Computing Systems (CHI), Apr. 2, 2005, pp. 711-720.

Chellapilla, Simard, "Using Machine Learning to Break Visual Human Interaction Proofs (HIPs)", retrieved on Apr. 16, 2010 at <<http://research.microsoft.com/en-us/um/people/kumarc/pubs/chellapilla_nips04.pdf>>, MIT Press, Advances in Neural Information Processing Systems, Neural Information Processing Systems (NIPS), 2004, pp. 1-8.

"Cisco 2008 Annual Security Report", retrieved on Apr. 16, 2010 at <<https://www.cisco.com/offer/email/17986/1/Cisco2008Annual_Security_Report.pdf>>, Cisco Systems, Inc., 2008, pp. 1-52.

Claburn, "Yahoo's CAPTCHA Security Reportedly Broken", retrieved on Apr. 16, 2010 at <<http://www.informationweek.com/news/internet/webdev/showArticle.jhtml?articleID=205900620>>,InformationWeek, Jan. 17, 2008, pp. 1-4.

Elson, Douceur, Howell, Saul, "Asirra: A CAPTCHA that Exploits Interest-Aligned Manual Image Categorization", retrieved on Apr. 16, 2010 at <<http://research.microsoft.com/en-us/um/people/jelson/asirra/papers/ccs2007.pdf, ACM, Conference on Computer and Communications Security (CCS), 2007, pp. 366-374.

Golle, "Machine Learning Attacks Against the Asirra CAPTCHA", retrieved on Apr. 16, 2010 at <<http://crypto.stanford.edu/~pgolle/papers/dogcat.pdf>>, ACM, Conference on Computer and Communications Security (CCCS), 2008, pp. 535-542.

Gossweiler, Kamvar, Baluja, "What's Up CAPTCHA? A CAPTCHA Based on Image Orientation", retrieved on Apr. 16, 2010 at <<http://www.richgossweiler.com/projects/rotcaptcha/rotcaptcha.pdf>>, ACM, Conference on World Wide Web (WWW), Apr. 20, 2009, pp. 841-850.

Hocevar, "PWNtcha—Captcha Decoder", retrieved on Apr. 16, 2010 at <<http://sam.zoy.org/pwntcha/>>, 2007, pp. 1-7.

Kluever, "Securely Extending Tag Sets to Improve Usability in a Video-Based Human Interactive Proof", retrieved on Apr. 16, 2010 at <<http://www.kloover.com/thesis/proposal.pdf>>, Rochester Institute of Technology, Master's Thesis Proposal, May 13, 2008, pp. 1-20.

Mori et al "Recognizing Objects in Adversarial Clutter: Breaking a Visual CAPTCHA", retrieved Apr. 16, 2010 at <<http://www.google.co.in/url?sa=t&source=web&ct=res&cd=1&ved=0CAYQFjAA&url=http%3A%2F%2Fciteseerx.ist.psu.edu%2Fviewdoc%2Fdownload%3Fdoi%3D10.1.1.12.9732%26rep%3Drep1%26type%3Dpdf&rct=j&q=Recognizing+objects+in+adversarial+clutter%3A+Breaking+a+visual+CAPTCHA&ei=qfDHS63wll7w0wTI7eXVDA&usg=AFQjCNGoU-04nMoVVv1I4IZgxVTo4fLkHA>>, IEEE Proc of Conf on Computer Vision & Pattern Recognition, vol. 1, 2003, pp. 134-141.

Moy, Jones, Harkless, Potter, "Distortion Estimation Techniques in Solving Visual CAPTCHAs", retrieved on Apr. 16, 2010 at <<http://www.cse.psu.edu/~datta/imagination/moy.pdf>>, IEEE Computer Society, Conference on Computer Vision and Pattern Recognition (CVPR), vol. 2, 2004, pp. 23-28.

Prasad, "CAPTCHA Revisited: Microsoft's 'Revised' CAPTCHA Busted by Spammers for Mass-Mailing Operations", retrieved on Apr. 14, 2010 at <<http://securitylabs.websense.com/content/Blogs/3195.aspx>>, Websense Security Labs, Sep. 30, 2008, pp. 1-21.

Prasad, "Google's CAPTCHA busted in recent spammer tactics", retrieved on Apr. 16, 2010 at <<http://securitylabs.websense.com/content/Blogs/2919.aspx#>>, Websense Security Labs, Feb. 2, 2008, pp. 1-7.

Prasad, "Spammer Anti-CAPTCHA Operations and Mass-Mailing Strategy", retrieved on Apr. 14, 2010 at <<http://securitylabs.websense.com/content/Blogs/3092.aspx>>, Websense Security Labs, May 15, 2008, pp. 1-16.

Rui, Liu, "ARTiFACIAL: Automated Reverse Turing test using FACIAL features", retrieved on Apr. 16, 2010 at <<http://research.microsoft.com/en-us/um/people/yongrui/ps/mmsj04hip.pdf>>, ACM, International Multimedia Conference (MM), 2003, pp. 295-298.

Thomas, Rusu, Govindaraju, "Synthetic handwritten CAPTCHAs", retrieved on Apr. 16, 2010 at <<http://www.cedar.buffalo.edu/~govind/papers/trg09.pdf>>, Elsevier Science Inc. New York, Pattern Recognition, vol. 42, No. 12, Dec. 2009, pp. 3365-3373.

von Ahn, Blum, Hopper, Langford, "CAPTCHA: Using Hard AI Problems for Security", retrieved on Apr. 16, 2010 at <<http://www.captcha.net/captcha_crypt.pdf>>, Springer, Lecture Notes in Computer Science, Proceedings of Conference on Theory and Applications of Cryptographic Techniques (EUROCRPYT), vol. 2656, May 4, 2003, pp. 294-311.

von Ahn, Blum, Langford, "Telling Humans and Computers Apart Automatically", retrieved on Apr. 16, 2010 at <<http://delivery.acm.org/10.1145/970000/966390/p56-von_ahm.pdf?key1=966390&key2=7143041721&coll=GUIDE&dl=GUIDE&CFID=84492897&CFTOKEN=36172283>>, Communications of the ACM, vol. 47, No. 2, Feb. 2004, pp. 57-60.

Yampolskiy, Govindaraju, "Embedded Noninteractive Continuous Bot Detection", retrieved on Apr. 16, 2010 at <<http://www.cs.vu.nl/~eliens/design/projects/local/cie/a7-yampolskiy.pdf, ACM, Computers in Entertainment, vol. 5, No. 4, Article 7, Mar. 2008, pp. 1-11.

Yan, El Ahmad, "A Low-cost Attack on a Microsoft CAPTCHA", retrieved on Apr. 16, 2010 at <<http://homepages.cs.ncl.ac.uk/jeff.yan/msn_draft.pdf>>, ACM, Conference on Computer and Communications Security, Oct. 2008, pp. 27-31.

Yan et al, "Breaking Visual CAPTCHAs with Naive Pattern Recognition Algorithms", retrieved on Apr. 16, 2010 at <<http://www.google.co.in/url?sa=t&source=web&ct=res&cd=1&ved=0CAYQFjAA&url=http%3A%2F%2Fciteseerx.ist.psu.edu%2Fviewdoc%2Fdownload%3Fdoi%3D10.1.1.97.2434%26rep%3Drep1%26type%3Dpdf&rct=j&q=Breaking+Visual+CAPTCHAs+with+naive+pattern+recognition+algorithms&ei=rvPHS76ZAoii0gSDkLjHDA&usg=AFQjCNGE09tDdqvAYgporeApA79-_yN8Lw>>, IEEE, Computer Security Applications Conference (ACSAC), Dec. 2007, pp. 279-291.

Yang, Zhu, Guo, Yang, Li, Yu, "A Comprehensive Human Computation Framework—With Application to Image Labeling", retrieved on Apr. 16, 2010 at <<http://delivery.acm.org/10.1145/1460000/1459423/p479-yang.pdf?key1=1459423&key2=6273041721&coll=GUIDE&dl=GUIDE&CFID=84493485&CFTOKEN=30626664>>, ACM, International Multimedia Conference (MM), Oct. 26, 2008, pp. 479-488.

\* cited by examiner

MANIPULABLE HUMAN INTERACTIVE PROOFS

BACKGROUND

Human interactive proofs (HIPs), also sometimes referred to as "CAPTCHAs" (Completely Automated Public Turing test to tell Computers and Humans Apart), are widely used on the Worldwide Web (WWW) for distinguishing actual human users from computer programs, bots, and the like. (Bots are generally software programs, scripts, or the like, that run repetitive automated tasks on the Internet.) For example, HIPs are often used by online email providers to prevent spammers from employing automated bots to sign up for a large number of free email accounts to use for sending spam. HIPs are also commonly used to prevent bot use and abuse of various other online services, such as online voting, purchasing of event tickets, or accessing certain databases, websites, blogs, forums, and the like.

HIPs can be text-based or non-text-based. Most of the HIPs currently in widespread use are text-based HIPs that utilize distorted and overlapping text characters. However, optical character recognition and character segmentation technologies have advanced sufficiently to enable circumvention of many conventional text-based HIPs. Additionally, many humans already find these text-based HIPs difficult to read, and thus, attempting to increase the security of these text-based HIPs by making them more difficult for a computer program to read also may make them unreadable for many humans. Further, most non-text-based HIPs are not practical for large-scale applications, which may need to produce millions of HIP tests on a daily basis. In addition, many non-text-based HIPs allow bots to achieve too high a success rate, such as by random guessing, and therefore are not sufficiently effective. For example, even if an HIP limits a bot's success rate to as low as 1%, this is generally not sufficient to prevent a spammer from acquiring a large number of spam email accounts because the cost of each attempt is very small.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein provide manipulable human interactive proofs that can be manipulated one or more times for determining verification information.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Manipulable Human Interactive Proofs

Figure 1:
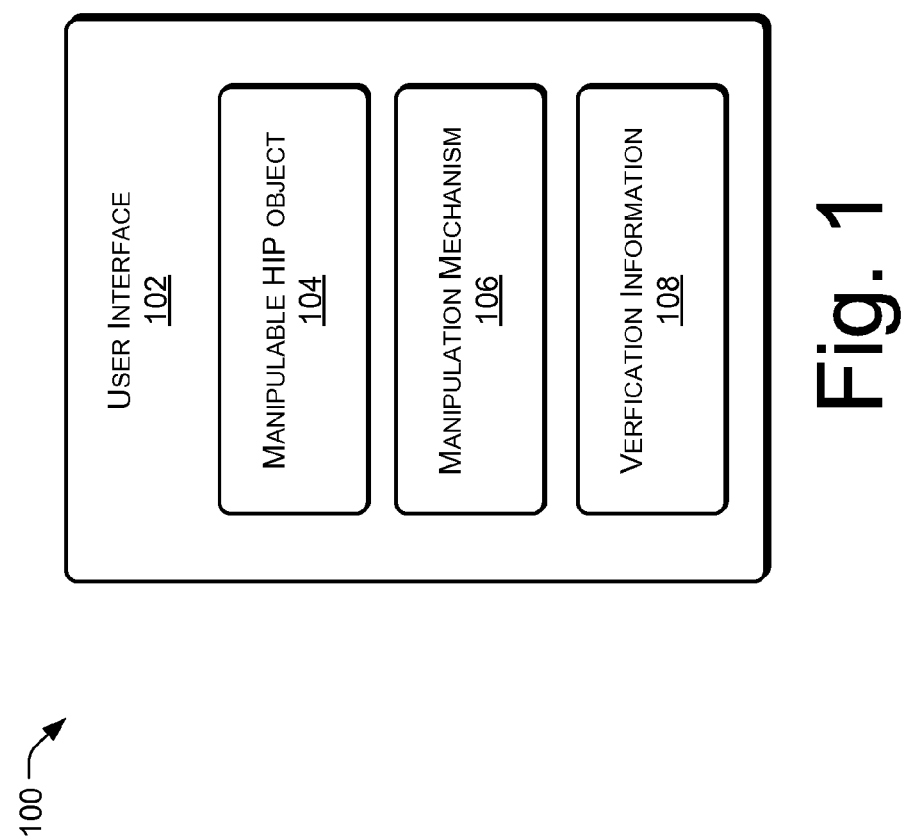
FIG. 1 is a block diagram of an example framework for a manipulable HIP according to some implementations disclosed herein.

The technologies described herein are generally directed towards human interactive proofs (HIPs), such as for use in controlling access on the Internet and other situations in which it is desirable to automatically determine whether interaction is taking place with a human or a computer program Implementations may include a manipulable or interactive HIP that is presented on a user interface. The presented HIP is manipulable to enable verification information to be determined from the HIP. The verification information determined from the HIP can then be returned in response to presentation of the HIP.

Some example implementations herein are described in the environment of an HIP presented as a test for proving that interaction is taking place with a human rather than a computer program as a primary actor. According to these implementations, a human user manipulates or otherwise interacts with the HIP in order to figure out the correct solution to provide as verification information. Consequently, without performing some type of manipulation or interaction with the manipulable HIP, the human user is unable to gather enough information from the HIP, and therefore is unable to return the correct verification information. For example, according to some implementations of the manipulable HIPs herein, after each manipulation or interaction, only partial information that could lead to a correct answer is revealed. This partial information may further be mixed with bogus or otherwise unhelpful information that may mislead a computer program, but which does not prevent a human from easily extracting the useful information. In addition, in some implementations, no useful information might be revealed after a particular manipulation or interaction, thereby leading to additional manipulations or interactions. Consequently, implementations herein may employ one or more manipulations or interactions with the same HIP object for gathering sufficient and correct verification information from the HIP. Further, in some of these implementations, the result of each manipulation or interaction with the manipulable HIP may or may not yield the equivalent of a non-manipulable HIP test.

The manipulable HIPs herein introduce an AI-hard problem since humans know or can easily understand how to interact with the HIP test properly to reach a state that partial information is semantically meaningful and recognizable which leads to determining the correct answer. Humans also are able to distinguish the useful information from the bogus or unhelpful information, while bots and other computer programs are not able to perform either of these operations. For example, the manipulations or interactions in the manipulable HIPs may introduce one or more additional degrees of freedom that can be exploited by implementations herein to increase security without adversely impacting human readability, which is a desirable property that traditional non-manipulable HIPs are unable to achieve. Accordingly, the manipulable HIPs disclosed herein typically have a higher security level than traditional non-manipulable HIPs.

FIG. 1 illustrates an example of a framework of a manipulable HIP 100 for explanation purposes. In the illustrated example, the manipulable HIP 100 includes a user interface 102 for presenting a display of a manipulable HIP object 104. For example, the manipulable HIP 100 may be presented with the user interface 102 when an acting entity attempts to access a location on the Internet, e.g., services, a webpage, a network component, or the like. Thus, the manipulable HIP 100 may be presented as a test which the entity must pass before being granted access to demonstrate that the entity is a human user and not a computer program, bot, etc.

The displayed manipulable HIP object 104 is presented in the user interface 102 and may be configured to be manipulated or interacted with one or more times by the human user for obtaining information from the manipulable HIP object 104. For example, the manipulable HIP object 104 may be a display of a 3-D graphical object, a display of series of images for simulating different viewing angles of a 3-D object, a display of a plurality images or objects that overlap and are movable relative to each other, or a display of other objects or images that can be moved and manipulated to obtain visual information contained therein that is not apparent from a single view. Thus, each view or image may contain at most only a subset of the entire set of information to be obtained for solving the manipulable HIP 100. In other words, a single view of the HIP object 104 provides insufficient visual information for a user to correctly respond to the HIP 100. Consequently, to gather enough visual information to correctly respond to the HIP 100, the HIP object 104 is manipulated by the user one or more times until sufficient visual information has been gathered.

In addition, the user interface 102 may provide a manipulation mechanism 106 that enables the manipulable HIP object 104 to be manipulated, moved, rotated, translated, repositioned, or the like, in one more degrees of freedom to obtain information from the manipulable HIP object 104. The visual information obtained from manipulation of the manipulable HIP object 104 may then be entered into the user interface 102 as verification information 108. The verification information 108 then can be returned and used to determine whether or not the test presented by the manipulable HIP 100 was passed by the entity.

Figure 2:
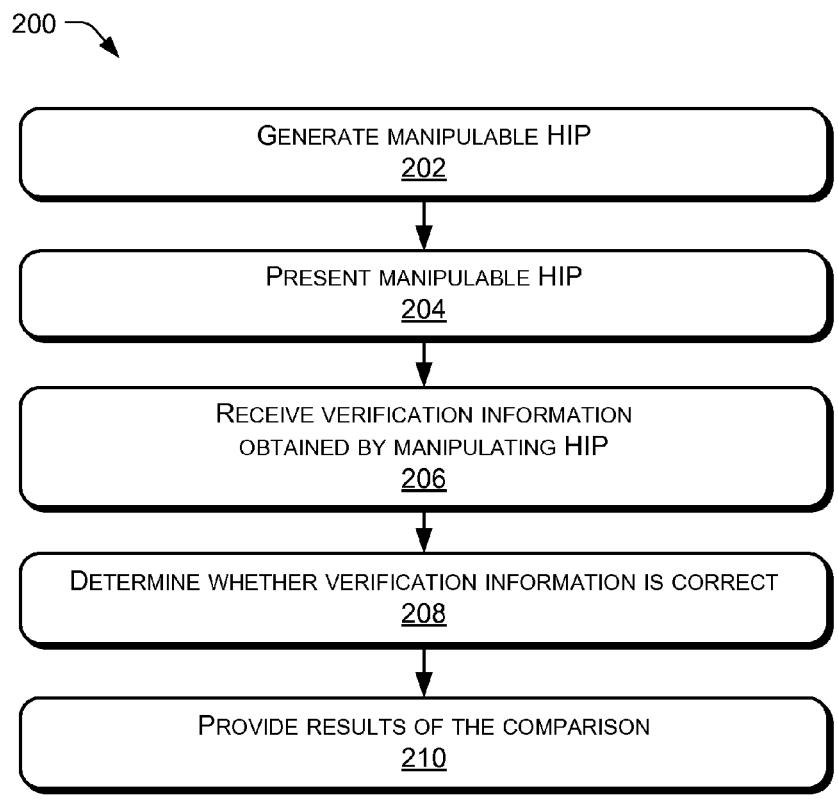
FIG. 2 is a flow diagram of an example process for employing a manipulable HIP according to some implementations.

FIG. 2 illustrates an example of a process 200 for employing a manipulable HIP according to some implementations herein. In the flow diagram, the operations are summarized in individual blocks. The operations may be performed in hardware, or as processor-executable instructions (software or firmware) that may be executed by one or more processors. Further, the process 200 may, but need not necessarily, be implemented using the framework of FIG. 1. Consequently, by way of explanation, and not limitation, the process 200 is described in the context of the framework of FIG. 1.

At block 202, a manipulable HIP is generated. For example, a manipulable HIP may be generated for use in determining whether an entity attempting to access a service, webpage, network component, or the like, is a human or an automated computer program.

At block 204, the manipulable HIP including a manipulable HIP object is presented. For example, the manipulable HIP may be presented as a test in a user interface. The user interface may provide a manipulation mechanism for enabling the user to manipulate or otherwise interact with a display of the manipulable HIP object for extracting useful information from the manipulable HIP object. For example, the user interface may provide various control mechanisms, buttons, anchor points, an interactive interface, or the like, for manipulating the displayed manipulable HIP object for extracting the information. For instance, a user may use a pointing device, such as a mouse, as a control device to manipulate the HIP object in one or more degrees of freedom for determining the verification information from the HIP object.

At block 206, verification information is received in response to the presentation of the manipulable HIP. For example, as a result of manipulating the HIP object one or more times, the user extracts enough information for solving the HIP. The user may enter the extracted information as the verification information. The user may then return this verification information through the user interface or by another technique.

At block 208, a determination is made as to whether the verification information received is correct. For example, the verification information received may be compared with a key or solution provided for the corresponding manipulable HIP.

At block 210, the results of the comparison are provided. For example, if the verification information received matches a solution corresponding to the manipulable HIP, then the test posed by the manipulable HIP has been passed. This being the case, the entity is assumed to be a human, and may be allowed to proceed with access to the services, webpage, etc. On the other hand, if the verification information does not match the solution corresponding to the manipulable HIP, then the entity might be denied access, an additional manipulable HIP might be presented to the entity as a second test, or the like.

The above framework and process for implementing manipulable HIPs can be used for automatically determining whether an entity or actor is a human or a computer program. Some examples of manipulable HIPs are described herein in the environment of controlling access to online services and websites on the WWW, but other implementations are not limited to the specific examples set forth. For example, the manipulable HIPs disclosed may be used in any environment or situation in which it is desired to distinguish between a human and a computer program as a primary actor.

Manipulable HIP Properties

One example of an application for the manipulable HIPs herein is for preventing spammers from opening new email accounts to use in sending out spam emails. Authoritative sources indicate that daily spam volume nearly doubled in 2008 relative to 2007, reaching as much as 200 billion spam emails per day, and accounting for nearly 90% of worldwide email. According to one spammer strategy, instead of using their own computers to send out spam emails, spammers may use worms, Trojan attacks, or other means to acquire botnets i.e., a large number of computers of unsuspecting victims taken over by the spammers and used to run bots. As mentioned above, bots are generally software programs, scripts, or the like, that run repetitive automated tasks on the Internet. The spammers use the bots to open a huge number of email accounts to be used for achieving the desired volume of spam emails. Spammers often target major free email services, such as Hotmail®, Gmail®, and Yahoo!® Mail to open spam email accounts. Consequently, email service providers have adopted the use of HIPs as a standard anti-spam technology to stop spammers from using automated programs for opening a large number of spam email accounts. However, this also means that a huge number of HIPs, e.g., millions on a daily basis, can be used every day by the free email service providers. To satisfy conditions of this scale, the manipulable HIPs herein may be configured to be automatically generated quickly and easily in large quantities. Further the responses to the manipulable HIPs can be automatically graded by the email provider's computers for determining whether the HIP test has been passed.

Some implementations herein provide for a manipulable text-based HIP that uses a graphical three-dimensional (3-D) object. The 3-D object may be composed of occlusion or conglomeration of multiple 3-D characters. A user is able to rotate and manipulate the 3-D object during the HIP test to view the 3-D object at different viewing angles. A human cannot see or recognize all the characters in any single view due to occlusion and rotation of the multiple characters. However, a human is able to mentally combine the recognizable characters or character portions seen at different views to extract the correct answer, i.e., the identities of the multiple characters contained in the HIP object. Further, in some implementations, the characters extracted from the HIP test may be listed in a particular order. Additionally, as an extra security boost (as compared to traditional text-based HIPs), according to some implementations, at any viewing angle, a recognizable character, if it exists, may be mixed or merged with one or more unrecognizable or bogus characters, shapes, or structures. Consequently, in addition to the segmentation and recognition of individual characters from the conglomeration, bots will have a number of additional tasks to perform to solve implementations of the manipulable 3-D HIP tests described herein. For example, in order to distinguish recognizable characters from unrecognizable characters when solving a manipulable 3-D HIP test, the HIP object is manipulated, moved, rotated, etc., to be viewed at different angles or positions to gather sufficient visual information. Further, not necessarily any angle will provide a character to be recognized. For instance at some angles, the HIP object merely appears as a clutter of shapes and structures which are difficult for bots to distinguish from legitimate characters. For example, when 3-D characters are viewed from their edges, they are indistinguishable from one another and merely appear as basic shapes or structures, thus forming unhelpful information that can be used to mislead or confuse a bot. However, humans are able to distinguish the legitimate characters from the clutter of unrecognizable shapes or structures and may continue to manipulate the HIP object to distinguish the characters contained therein.

Two examples of manipulable 3-D objects are described below, with the first example being referred to as a heap 3-D object and the second example being referred to as an ordered 3-D object. Both examples use 3-D characters for forming manipulable HIPs. In a 3-D heap object, 3-D characters are arranged in a heap or conglomeration that a user may move or rotate to view at different angles to recognize the characters in the heap. Additionally, there may be no particular spatial order for the constituent characters in a 3-D heap test. In the second example for an ordered 3-D object, on the other hand, the constituent 3-D characters may be ordered spatially along a rotational axis so that both the identification of the characters and the order of the characters may be specified for passing an ordered 3-D test. Further, while the examples are described herein in the context of 3-D rotatable objects, other implementations herein are not limited to rotatable 3-D objects and may encompass other manipulable objects, displays, and the like.

Manipulable Heap HIP

Figure 3A:
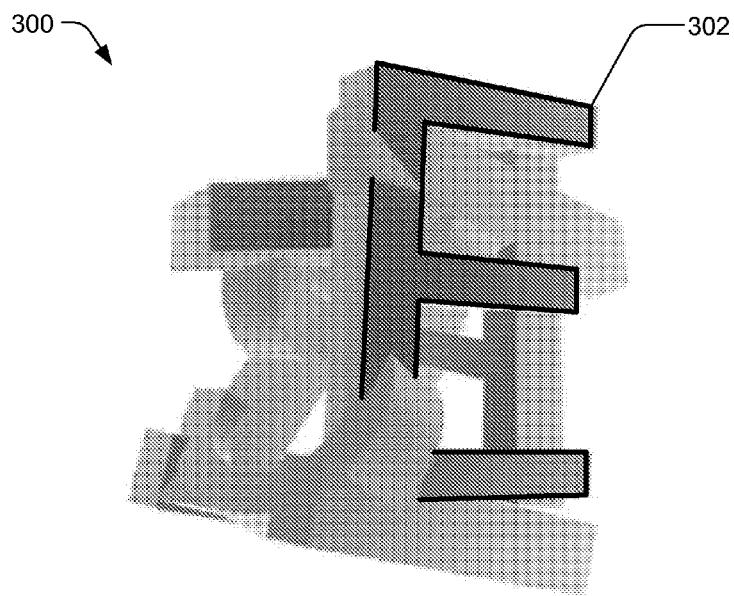
FIGS. 3A-3D illustrate an example of a manipulable heap object according to some implementations.
Figure 3B:
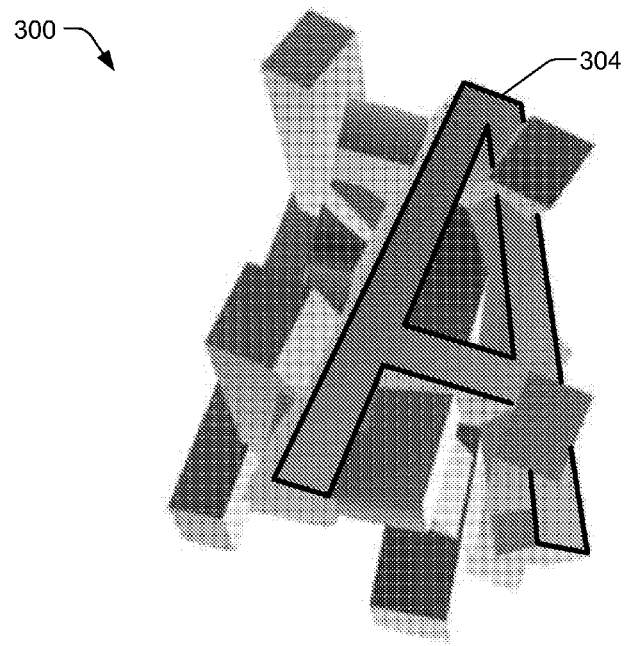
Figure 3C:
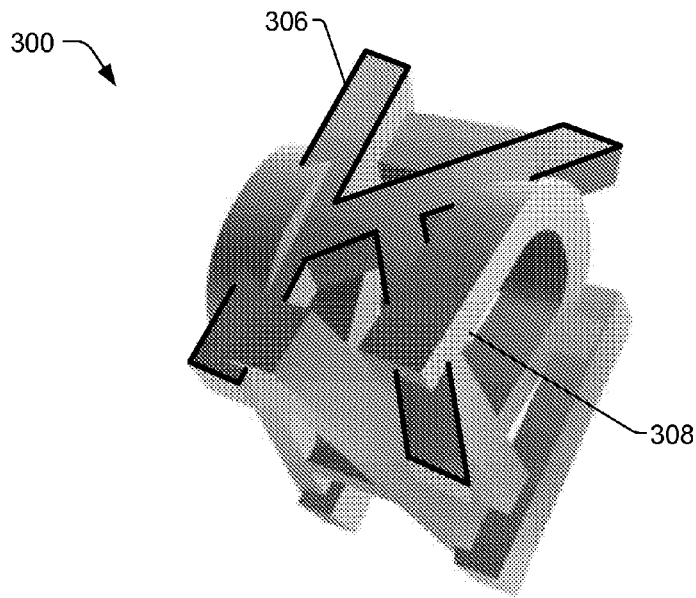
Figure 3D:
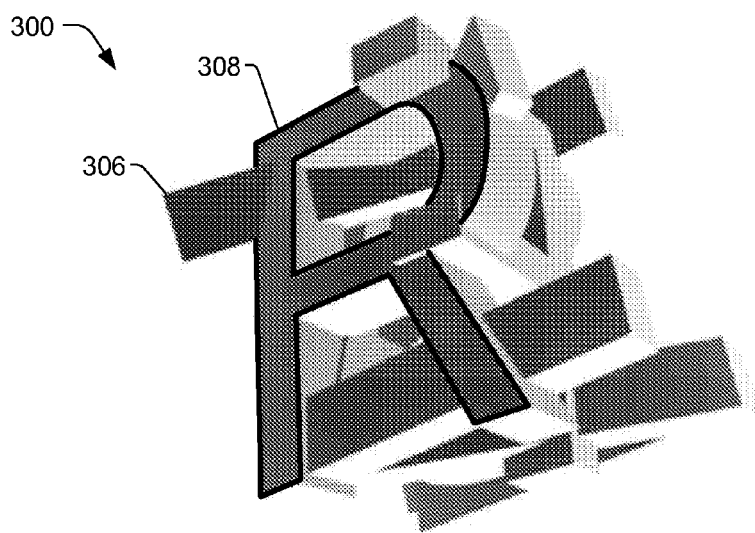

FIGS. 3A-3D illustrate four views of an example of a 3-D object 300 having a heap configuration suitable for use as an HIP. In the illustrated example of FIGS. 3A-3D, recognizable characters are outlined by black lines to illustrate the shape of the character. These outlines are provided in FIGS. 3A-3D for explanation purposes, but may not be present in implementations of actual HIPs. As mention above, in this example, the 3-D object 300 includes a plurality of 3-D characters arranged in a conglomeration or heap in which the characters are rotated and occlude one another while still maintaining sufficient separation such that typically one character out of the plurality of characters in the heap can be easily recognized when viewed at an appropriate angle. In the illustrated example of FIG. 3A, the character "E" 302 is distinguishable from the 3-D object 300 in this view. When the 3-D object 300 is rotated in one or more directions, the character "A" 304 becomes distinguishable, as illustrated in FIG. 3B. When the 3-D object 300 is rotated additionally, the character "K" 306 becomes visible, as illustrated in FIG. 3C. Further, when the 3-D object 300 is rotated yet again, the character "R" 308 becomes distinguishable, as illustrated in FIG. 3D. Thus, the 3-D object 300 provides a plurality of characters 302-308 that can be distinguished by manipulating the 3-D object 300 multiple times.

3-D object 300 may be constructed by arranging the characters 302-308 roughly as a polyhedron, with certain randomness being introduced. For example, the characters may be arranged according to a cubic, pyramidal, tetrahedron, octahedron, or other polyhedral shape, with one character corresponding to each side or planar surface of the polyhedron. Furthermore, for example, one or more sides of the polyhedral shape may not include a character or may include a bogus character or shape. Additionally, each of the characters may have a different and/or complex lighting to enhance the 3-D viewing for each character so that humans are more easily able to recognize each character. Also, in some implementations, a particular character may be partially occluded by or merged with other characters, even when the particular character is viewed at the best angle for recognition. For example, as shown in FIG. 3C, the character "K" 306 is partially occluded by portions of the character "R" 308, and also occluded by or merged with some portions other characters. Similarly, in FIG. 3D, the character "R" 308 is partially occluded by and merged with portions of character "K" 306 and some potions of other characters. This occlusion and merging does not affect much a human's ability to recognize the characters since humans are able to use visual depth information from multiple views to determine which part of each character has been occluded during recognition of a 3-D character. Further through manipulation, humans are able to determine an appropriate viewing angle for easily recognizing each character. However, these tasks can pose a challenging problem for a computer program, e.g., deducing the depth of a character strokes, particularly under varying lighting conditions or effects. It is also difficult for a computer program to recognize a 3-D character having occluded or merged portions, and also to determine an appropriate viewing angle to enable a character hidden in a heap of characters to be recognized.

Figure 4:
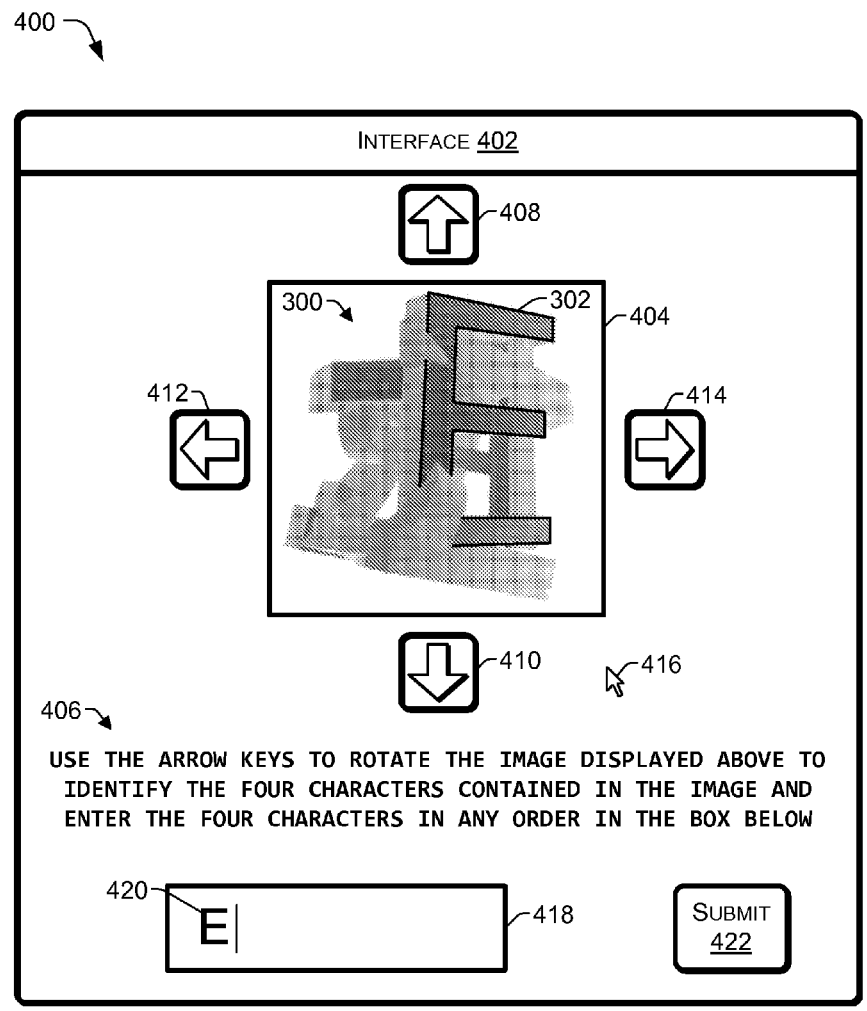
FIG. 4 illustrates an example of an interface for a manipulable HIP according to some implementations.

FIG. 4 illustrates an example of a configuration for a manipulable HIP 400 according to some implementations herein. The manipulable HIP 400 includes an interface 402 having a presentation area 404 for presenting a display of a manipulable heap 3-D object, such as the 3-D object 300 of FIGS. 3A-3D. As mentioned above, in this example, the 3-D object 300 includes a plurality of 3-D characters arranged in a joined conglomeration or heap, which may be based on a polyhedron, and in which characters can be easily recognized when the 3-D object 300 is viewed at corresponding appropriate angles.

In the illustrated example, a user may be requested to identify and input a certain number of characters deduced from the manipulable HIP in order to correctly pass the HIP. For example, when the 3-D object 300 is rotatable in any direction, the HIP test can permit these characters to be input in any order. As discussed above, in order to recognize each character, a user manipulates the 3-D object 300 so that the characters are displayed at a suitable angle to enable recognition. For example, the 3-D object 300 may be fixed at a central rotation point corresponding to a center point of the polyhedral shape, and able to rotate in any direction about that center point so that there is no restriction on the direction rotation. This enables the 3-D object 300 to be rotated to any viewing angle in the 3-D domain. By looking at the 3-D object 300, humans generally know or can easily figure out how to rotate the 3-D object 300 to multiple positions in which each character becomes recognizable for obtaining sufficient visual information to solve the HIP.

Interface 402 may include instructions 406 for instructing a user on how to complete the manipulable HIP 400. Furthermore, interface 402 may include one or more manipulation mechanisms for enabling manipulation of the 3-D object 300. In the illustrated example, interface 402 includes control buttons, such as an up button 408, a down button 410, a left button 412, and a right button 414. A pointing device, such as a mouse pointer 416, or the like, may be used to click on the buttons 408-414 to rotate the 3-D object 300. Alternatively, keyboard buttons, such as corresponding arrow keys on the keyboard, may be used for rotating the 3-D object 300. As yet another alternative, the mouse pointer 416 may be used to click directly on the 3-D object 300 and rotate the 3-D object by dragging in one or more directions. Other mechanisms for manipulating the 3-D object 300 may also be used, and implementations herein are not limited to any particular mechanism for rotating or manipulating the 3-D object 300.

As the user manipulates the 3-D object 300, the user is able to recognize multiple characters. The user is further able to enter the recognized characters into an information entry location 418 in the interface 402. In the illustrated example, the user has identified character "E" 302 in the 3-D object 300, and has entered this as entry 420 in the information entry location 418. When the user has identified and entered the requested number of characters, the user may activate the submit button 422 to submit the entered characters as verification information for completing the HIP test.

Since there is no specified input order in this example, no characters are used more than once in the 3-D object 300. Additionally, there may be no single correct orientation direction in a heap 3-D object. Consequently, to avoid confusion, characters that may appear similar to each other when rotated are removed from the set of legitimate characters available to be used for constructing a heap 3-D object. For example, "N" and "Z" might be confused they are rotated 90 degrees, and "M" and "W" might be confused if they are rotated 180 degrees. Therefore, "N" and "Z" and "M" and "W" are removed from the set of available characters. Furthermore, the letter "I" may also be removed from the set of available characters, since an "I" might be confused with a straight stroke or portion of another character. Additionally, in some implementations, the set of available characters may further be limited to capital letters of the English alphabet to avoid any confusion between characters.

What is more, as mentioned above, it is possible at some viewing angles that no character might be recognizable. For example, one or more sides the polyhedron upon which the 3-D object is based may not have a corresponding character placed towards that direction and thus no character can be recognized from that viewing angle. Also, bogus characters or misleading shapes might be placed in one or more sides. Additionally, at some viewing angles, only the edges of characters might be clearly seen. When this occurs, a human has no problem detecting this and manipulating the object to a different view, but a bot might not be able to readily detect this.

Furthermore, the characters 302-308 used in the specific 3-D object 300 illustrated in FIGS. 3A-3D have not been distorted. Security afforded by the 3-D object 300 can be further enhanced by applying warping and distortion to the 3-D characters when arranging the characters in the 3-D object, or by varying or mixing 3-D fonts when generating the 3-D objects for use in the HIP tests. Warping makes the flat surface of a 3-D character no longer flat, making it more difficult for bots to detect a character's surface, which, in turn, makes it difficult for a bot to use pattern matching for recognizing particular characters in the 3-D object.

Manipulable Ordered HIP

The HIP implementing the heap 3-D object 300 described above may not specify any particular ordering of the characters in the correct answer. Furthermore, there may be a restriction on the maximum number of characters that can be used in a heap 3-D object since humans may not be able to quickly recognize all the characters contained in a heap 3-D object if the object contains too many characters. These restrictions reduce the search space making this test somewhat easier for an automated computer program to solve. Consequently, other implementations herein may contain more characters in an HIP test and may also include the ordering of characters in the answer so that the search space becomes much larger and more difficult to solve. These ordered implementations further lower the potential success rate of a bot, such as when a brute force attack is employed.

Figure 5B:
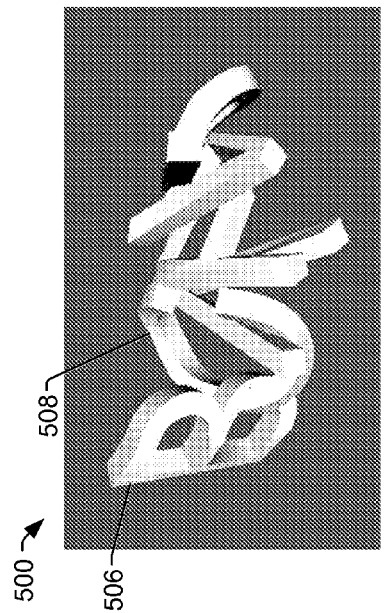
FIGS. 5A-5H illustrate an example of a manipulable ordered object according to some implementations.
Figure 5D:
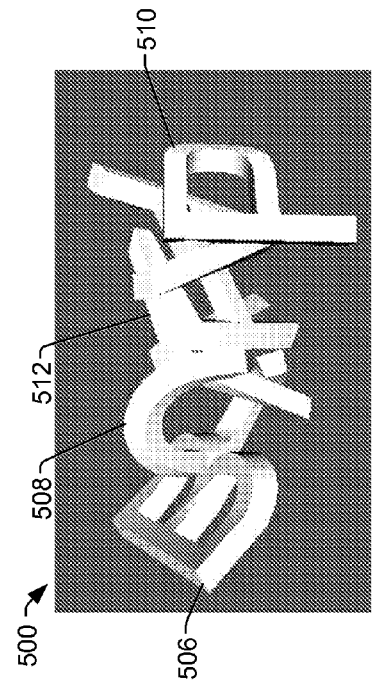
Figure 5A:
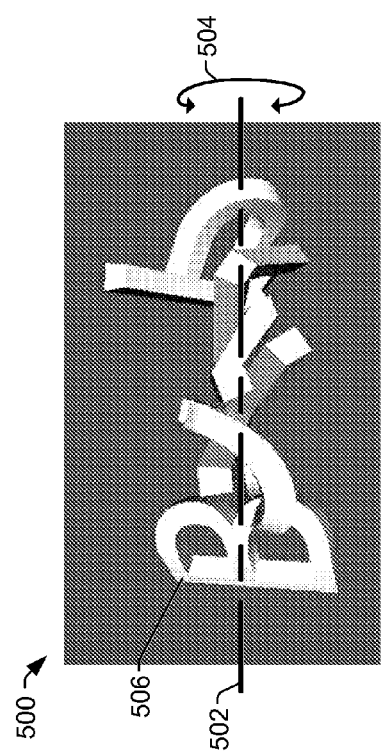
Figure 5C:
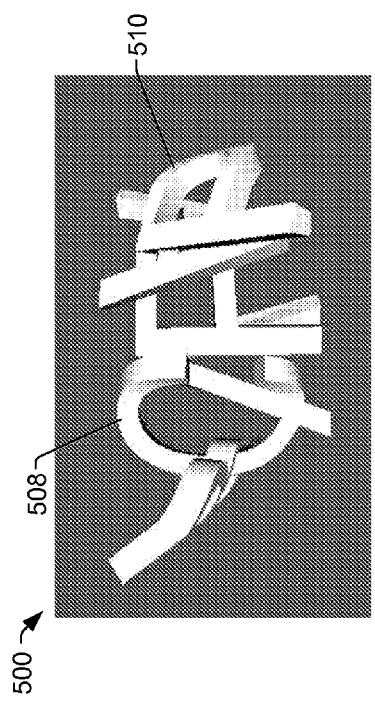

FIGS. 5A-5G illustrate an example of an ordered 3-D object 500 according to some implementations suitable for use in a manipulable ordered HIP. As illustrated in FIG. 5A, a plurality of 3-D characters are arranged in a conglomeration or mass along an axis of rotation 502 to form the ordered 3-D object 500. As indicated by arrow 504, a user is able to rotate the ordered 3-D object 500 around the axis of rotation 502 to recognize individual characters contained in the 3-D object 500, and thereby determine the solution to the HIP test. For example, as illustrated in FIGS. 5A and 5B, the character "B" 506 is distinguishable on the left end of the 3-D object 500, as the 3-D object 500 is rotated from the position in FIG. 5A to the position in FIG. 5B. As the 3-D object 500 is rotated from the position in FIG. 5B to the position in FIG. 5C, character "C" 508 becomes recognizable, and the user also may obtain some information regarding the identity of some of the other characters in the 3-D object 500. Thus, as the object is rotated from the position in FIG. 5C to the position FIG. 5D, a character "P" 510 on the right end of the 3-D object 500 becomes recognizable. Further, a character "F" 512 also becomes at least partially recognizable at this point. As the 3-D object 500 continues to be rotated to the position of FIG. 5E, no additional characters are immediately recognizable. Instead, only the edges of the characters in the center portion of the 3-D object 500 are visible at this angle of view. As the 3-D object 500 continues to be rotated to the position of FIG.

5F, character "V" 514 and character "A" 516 begin to become recognizable. As the 3-D object 500 continues to be rotated to the position of FIG. 5G, character "V" 514 and character "A" 516 become more clearly recognizable. Further, if there is any doubt in the user's mind as to whether character "F" 512 is in fact an "F" and not some other character, this is clearly indicated in this view despite the fact that the "F" is upside down. The user may continue to rotate the 3-D object 500 to the position of FIG. 5H or to any other position to confirm in the user's mind the identity of any of the characters in the 3-D object 500. Thus, each one or more characters recognized might be considered to be a subset of the total set of characters in the 3-D object, with only a subset of characters being recognizable at any one viewing angle.

The restriction on the allowed direction or degrees of rotation ensures that the order of the characters is preserved no matter how the ordered 3-D object 500 is rotated. This restriction avoids any confusion as to the correct ordering of the characters in the ordered 3-D object 500. Accordingly, this configuration is different from the arbitrary rotations allowed in the heap 3-D object 300 described above. In addition, according to some implementations of the ordered 3-D objects herein, characters may be strongly overlapped with neighboring characters, as illustrated in FIGS. 5A-5G. Furthermore, unlike in the heap 3-D object 300, the same character can be repeatedly used in an ordered 3-D object, thereby increasing the pool of characters that can be used in a HIP. However, similar to the 3-D heap objects, the characters that might cause confusion after being rotated are removed from the set of legitimate characters. For example, "M" and "W" might be confused with each other upon being rotated 180 degrees, and are therefore removed from the set of available legitimate characters. However, since the allowed directions of rotation for an ordered 3-D object is a subset of the allowed directions of rotation in a heap 3-D object, fewer characters are removed from the set of available legitimate characters used for constructing an ordered 3-D object. For example, "Z" and "N" can remain in the set of legitimate characters in these implementations.

Furthermore, while the arrangement of characters in a heap 3-D object may be rather simple, as described above, the arrangement of characters in an ordered 3-D object may be made much more complex, such as with overlapping and distortion of the characters. For example, little or no overlapping of characters in an ordered 3-D object may leak some information that could be exploited by bots for performing segmentation. For instance, the left part of the leftmost character or the right part of the rightmost character does not overlap with any characters. Thus, unlike the heap 3-D object in which any of the characters can be configured to overlap with others, overlapping in ordered 3-D object is typically an overlapping with the immediately neighboring characters. For example, a foreground stroke may have continuous contours while an occluded stroke may have discontinuous contours at the occluded locations. This information can be used by a human to deduce which character is on top for two overlapping characters in an ordered 3-D object. In addition, for example, if a given character has a flat surface, this surface may be canted or angled relative to the axis of rotation so that the surface is not parallel with the axis of rotation. This prevents the flat surface from being easily detected and recognized as belonging to a character by a computer program.

Figure 5F:
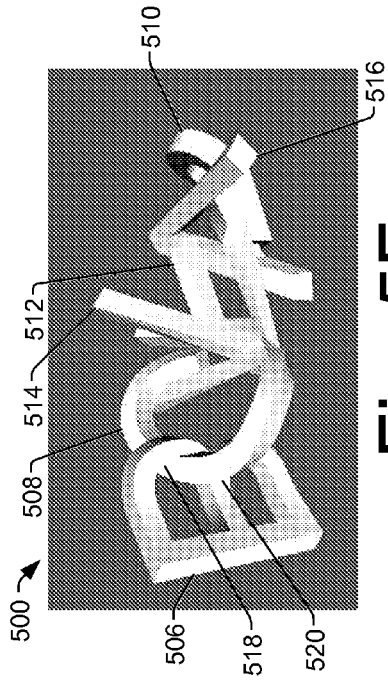
Figure 6:
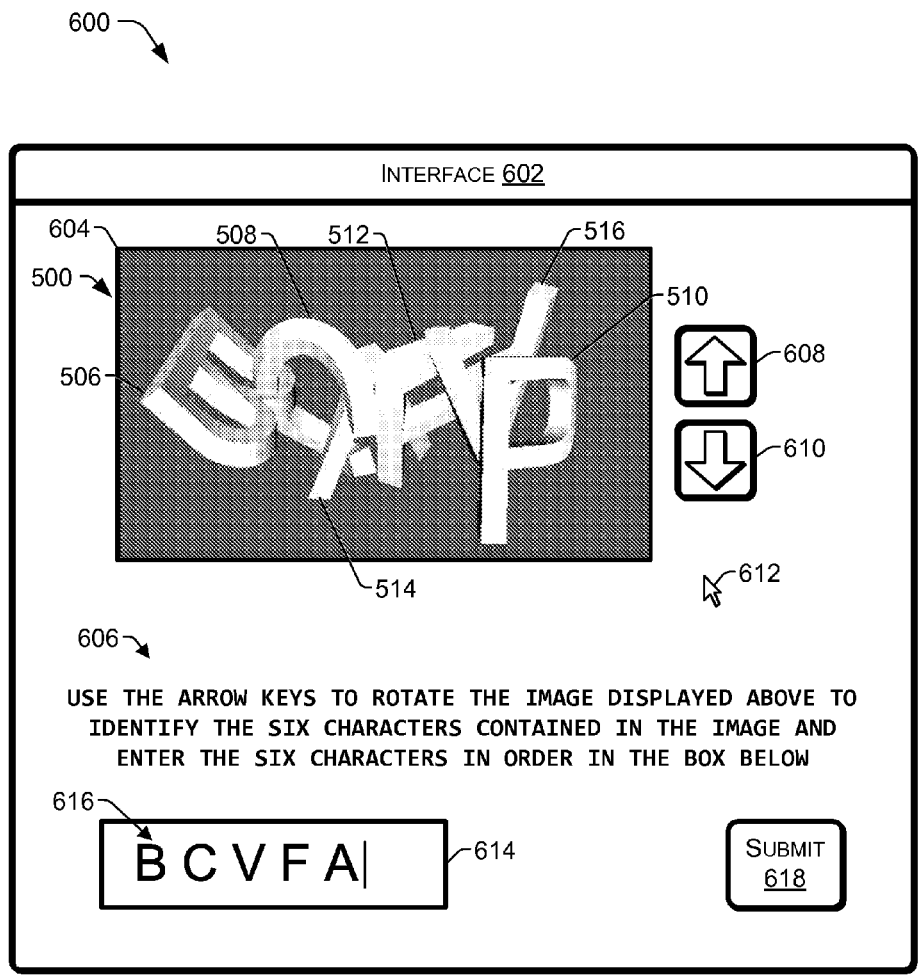
FIG. 6 illustrates another example of an interface for a manipulable HIP according to some implementations.

FIG. 6 illustrates an example of a configuration for a manipulable HIP 600 according to some implementations herein. The manipulable HIP 600 includes an interface 602 having a presentation area 604 for presenting a display of a manipulable ordered 3-D object such as the 3-D object 500 of FIGS. 5A-5G. As mentioned above, in this example, the 3-D object 500 includes a plurality of 3-D characters arranged in an ordered grouping in which characters can be easily recognized by a human when the 3-D object 500 is rotated about an axis of rotation, such as the x-axis.

In the illustrated example, a user may be requested to identify and input the characters deduced from the HIP in the correct order to pass the HIP. For example, the recognized characters are entered in the same order in which they are arranged in the 3-D object 500. As discussed above, to recognize all the characters, a user has to manipulate the 3-D object 500 so that the characters are displayed at a suitable angle to enable recognition.

Interface 602 may include instructions 606 for instructing a user on how to complete the manipulable HIP 600. Furthermore, interface 602 may include one or more manipulation mechanisms for enabling manipulation of the 3-D object 500. In the illustrated example, interface 602 includes control buttons including an up button 608 and a down button 610. A pointing device, such as a mouse pointer 612, or the like, may be used to click on the buttons 608, 610 to rotate the 3-D object 500 about its axis of rotation. Alternatively, keyboard buttons, such as corresponding up and down arrow keys, on a keyboard may be used for rotating the 3-D object 500. As yet another alternative, the mouse pointer 612 may be used to click directly on the 3-D object 500 and rotate the 3-D object 500 by dragging in the up or down directions. Other mechanisms for manipulating the 3-D object 500 may also be employed, and implementations herein are not limited to any particular mechanism for rotating or manipulating the 3-D object 500.

In solving a manipulable ordered HIP 600, a user may rotate the HIP object 500 around the axis of rotation until all the characters are recognized. Thus, as the user manipulates the 3-D object 500 using the manipulation mechanism, the user is able to recognize the multiple characters 506-516. The user is further able to enter the recognized characters from left to right into an information entry location 614 in the interface 602. In the illustrated example, the user has identified characters "B" 506, "C" 508, "V" 514, "F" 512 and "A" 516 in the 3-D object 500, and has entered these characters in order as entry 616 in the information entry location 614. When the user has identified and entered all the displayed characters in the correct order, the user may activate the submit button 618 to submit the entered characters as verification information for completing the HIP 600.

Generating an Ordered 3D Object

Figure 7:
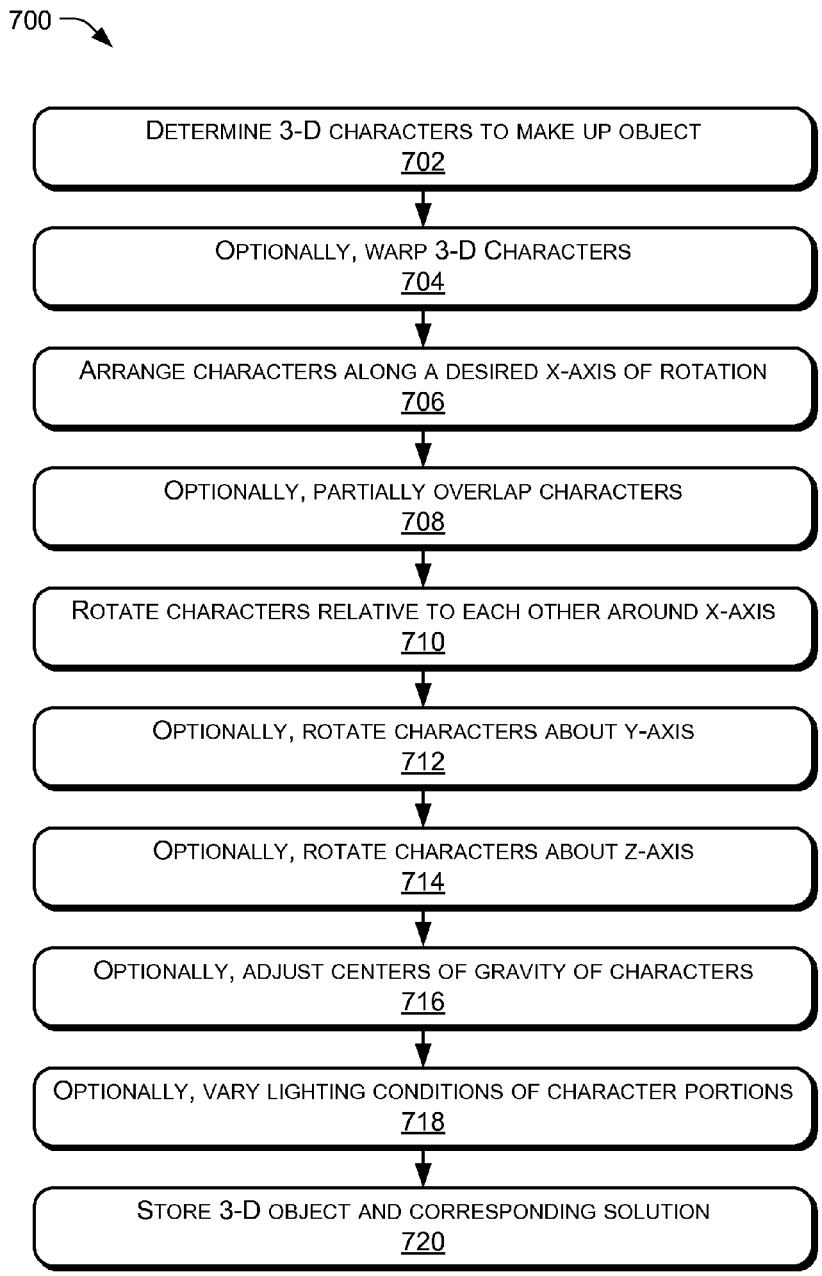
FIG. 7 is a flow diagram of an example process for generating ordered 3-D objects according to some implementations.

FIG. 7 is a flow diagram of an example process 700 that may be used for generating an ordered 3-D object. The flow diagram of FIG. 7 includes a number of optional operations that may be applied for increasing the security of an ordered 3-D object when generating the ordered 3-D object. Thus, while a number of optional operations are described for increasing the difficulty for a computer program to recognize characters in the ordered 3-D object, not all of these operations are necessary for the ordered 3-D object to still be fully functional in the manner described above, and these optional operations may be selectively applied depending on a desired level of security.

At block 702, the characters to be used in the 3-D object are determined. For example, 3-D objects may be generated using a prescribed number of characters selected at random. Alternatively, the characters may be selected to form one or more words selected at random, or the like. As mentioned previously, in the case of ordered 3-D objects, the same characters may be used more than once in the same 3-D object.

At block 704, optionally, to increase security, some or all of the 3-D characters may be warped, for example, so that the surface of a character is no longer a flat plane. For example, the 3-D characters may be curved or distorted out of one or more flat planes normally making up characters.

At block 706, the characters are arranged along a desired axis of rotation. For example, in some implementations the characters may be arranged along the x-axis of a 3-D Cartesian coordinate system (which corresponds to the horizontal axis in the plane of the paper in FIGS. 5A-5H), so that the x-axis forms the axis of rotation along which the 3-D object is intended to be rotated. Alternatively, of course, the characters may be arranged along a different axis such as the y-axis, or even some oblique axis.

At block 708, optionally, to increase security, one or more of the characters may be arranged to partially overlap with the neighboring characters. In some implementations, as illustrated in FIGS. 5A-5H, the characters may be strongly overlapped to substantially increase the difficultly for a bot to recognize the characters.

At block 710, the characters are rotated relative to each other around the x-axis so that the characters do not all lie in the same plane, or in other words, so that a single view of the characters does not allow all the characters to be recognized. As one example, each character may be rotated by a random angle $\alpha_i$ in relation to the character to its left, where $20° < |\alpha_i| < 45°$, and i is the index of the character. The rotation of the characters relative to each other ensures that different characters can be recognizable at different rotation angles, and relative rotation of any two neighboring characters is not too large. Furthermore, if two neighboring characters are rotated too much relative to each other, e.g., about 90 degrees, then their heights are very different when rotating the 3-D object around the x-axis. This difference can actually make it easier for a computer program to segment and identify the two characters.

At block 712, optionally, to increase security, one or more of the characters may be rotated about the y-axis, which corresponds to the vertical axis in the plane of the paper in FIGS. 5A-5H. As one example, each character may be rotated about the y-axis a random angle $\beta_i$ relative to the character to its left, where $20° < |\beta_i| < 30°$, while ensuring that the total rotation angle against the character's original position remains smaller than a threshold angle, e.g., 45 degrees. This operation for rotation about the y-axis provides that the surface of a character, even if flat, is not in parallel with the x-axis, which can help to prevent bots from locating the flat surface of the character (e.g., by grouping the points that reach the maximum distance to the x-axis simultaneously during rotations along the x-axis), and thereby hinder automatic character recognition.

At block 714, optionally, to increase security, one or more of the characters may be rotated about the z-axis, which corresponds to an axis perpendicular to the paper in FIGS. 5A-5H. As one example, each character may be rotated about the z-axis by a random angle $\gamma_i$ relative to the character to its left, where $10° < |\gamma_i| < 15°$, while ensuring that the total rotation angle of the character in comparison to its original position remains smaller than a threshold angle, e.g., 30 degrees.

At block 716, optionally, to increase security, the characters may be arranged or adjusted so that the centers of gravity of all the characters do not lie in the same plane. For example, having all of the characters with their centers of gravity in the same plane can make it easier for a computer program to recognize characters.

Figure 5H:
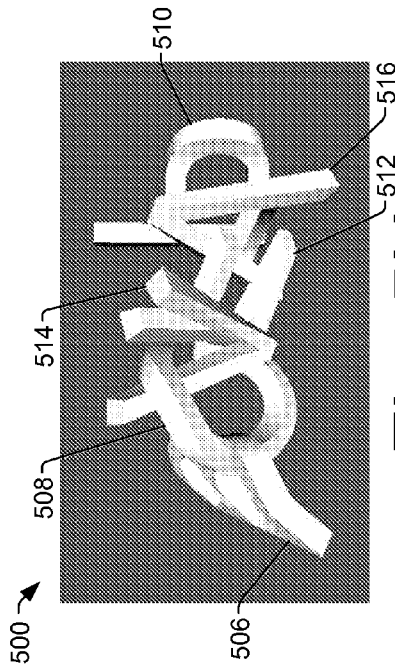
Figure 5E:
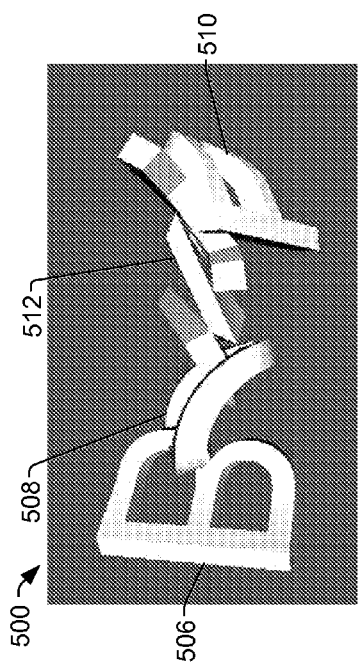
Figure 5G:
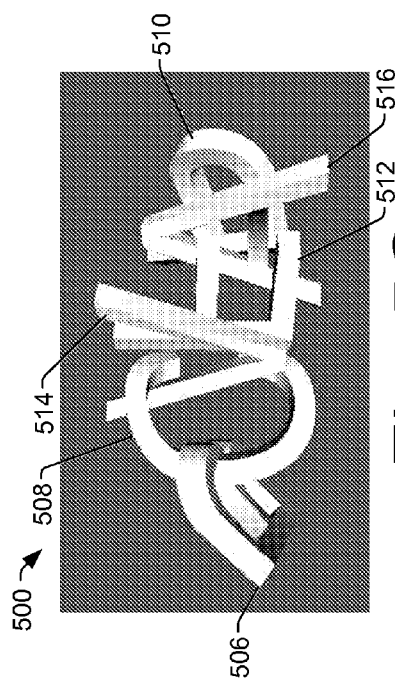

At block 718, optionally, to increase security, lighting conditions or effects may be varied for different characters in 3-D object. For example, certain touching or crossing regions of characters may be forced to have the same lighting effect to hide the depth information so that bots cannot determine whether the touching or crossing regions are from different characters or from the same characters. An example of this is illustrated in FIG. 5F by the regions 518 and 520 where the "B" and "C" characters touch and cross each other. For example, at region 520 the character touching region has been whitened so that the touching portions from the different characters appear the same as the portion of the particular character, resulting in more difficulty in segmentation. This non-natural lighting that can prevent a bot from determining which character is in the foreground, even if the bot has concluded that there are two different characters present. However, such a lighting effect has been found to not have much effect on human readability of the characters.

At block 720, the generated 3-D object made up of the multiple 3-D characters is stored along with a corresponding solution key identifying the characters contained in the 3-D object.

Images as Manipulable Objects

In the two example implementations of manipulable HIPs described above, the 3-D objects 300, 500 may be delivered to a client computing device as a manipulable HIP that users are able to interact with for displaying different views of the 3-D object at different viewing angles. However, many conventional web browsers which rely on JavaScript® may not easily support the display of genuine 3-D objects. As one solution, a plug-in may be provided to each major web browser to enable viewing and manipulation of 3-D objects. However another shortcoming of the use of 3-D objects is that sending a 3-D object to a client computing device can use up additional computing resources and network bandwidth. Additionally, the 3-D objects typically contain much more information than an end user actually needs to merely view the object from different angles for recognizing characters contained therein. This additional information, such as details of how the object is assembled, can be used by computers to improve the success rate of attacks.

Consequently, according to some implementations herein, there is no need to send the actual 3-D object as part of the manipulable HIP. For instance, instead of sending the actual 3-D object as part of the manipulable HIP test, a group or series of images of the 3-D object taken from different viewing angles can be sent as the manipulable object. This group of images may be configured and arranged so that when the images are manipulated the images simulate or create an optical illusion of a 3-D object being rotated or otherwise manipulated. These implementations result in savings in server and client computing resources and network bandwidth, while also increasing the long-term security of the manipulable HIP scheme. The images may be jpeg, tif, png, gif, or any other suitable image format.

As demonstrated above in FIGS. 3A-3D and 5A-5H, it is apparent that a human is able to recognize the characters in an HIP test based on a certain number of different views taken at some discrete viewing angles. Consequently, it is possible for a human to solve the HIP test based only on this discrete number of images of these discrete views. Uniform sampling may be used to generate the images of the 3-D objects at different viewing angles. These images may then be downloaded as the manipulable HIP object to a client computing device along with suitable JavaScript code that enables switching from one image to another, for example, to mimic rotation operations of a 3-D object around permitted rotation axes.

For the ordered 3-D object, the camera can be rotated around the x-axis a complete 360 degrees to take images at equal rotation angles. For instance, when an HIP test consists of six to eight characters, experiments have shown that eight or so images taken at equal rotation angles may typically be sufficient for most humans to recognize all the characters in an ordered HIP test, as described above. Of course, more images would make the rotation operation jump at a finer step, resulting in a smoother rotation experience for the user, but this is typically not needed for recognizing the characters for passing of the HIP test.

With respect to the heap 3-D objects, according to some implementations, an image may be taken for each character so that the camera has an angle of δ to the normal direction of the character, for example, where $30°<|δ|<45°$. This angle range is based on experimental data which showed that viewing the heap 3-D object from such an angle results in an easy recognition of the characters by humans, although other implementations are not limited to this range. Further, based on this range, it is possible to calculate the sampling steps around different rotation axes to generate a group of images taken at different viewing angles. This group of images can then be downloaded to a client computing device as the manipulable object in the manipulable HIP. Due to the multiple degrees of freedom in rotation allowed for heap 3-D objects, many more images at different viewing angles are needed for heap 3-D objects than for the ordered 3-D objects which may only be rotatable about a single axis.

As mentioned above, another benefit of merely providing images of the 3-D objects instead of the 3-D objects themselves is that adversaries, such as a spammer attempting to devise a bot able to solve the manipulable HIP, will have to reverse engineer the 3-D object from the sampled views by merging the data of the different views in order to segment the characters inside the HIP. Reconstruction of a 3-D model from sampled views is also a challenging task. Accordingly, the combination of these of these more difficult and additional challenging tasks results in much higher security for the manipulable HIPs disclosed herein as compared to traditional text-based HIPs.

In addition the manipulable HIP implementations disclosed herein are able to further increase security by using strong overlapping of characters. This would normally reduce human readability in a traditional text-based HIP since a single view is used in the traditional approach. However, in the manipulable HIP disclosed herein, multiple views of the same object are provided. The information from those multiple views can be easily combined in human's mind to recognize all the characters contained in an HIP problem. Therefore, human readability is preserved while security is enhanced.

Example System Architecture

Figure 8:
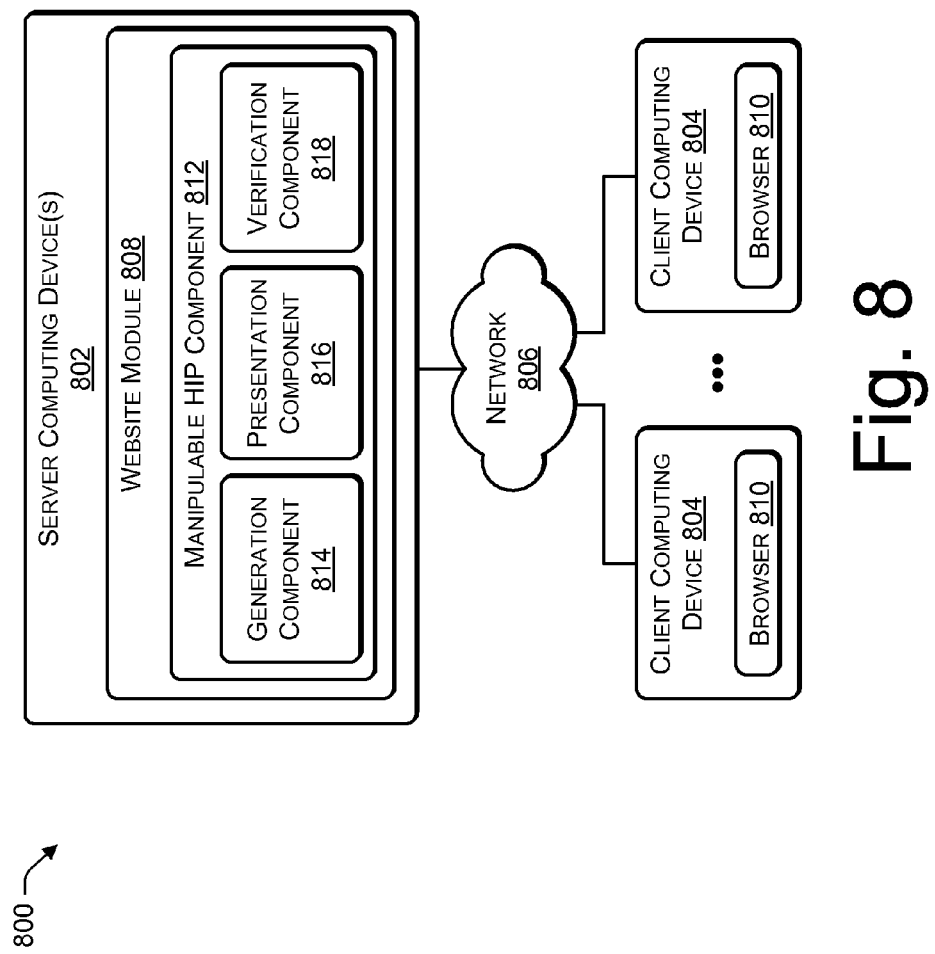
FIG. 8 illustrates an example system architecture according to some implementations.

FIG. 8 illustrates a block diagram of an example system architecture 800 for explanation purposes. In the illustrated example, architecture 800 includes at least one server computing device 802 able to communicate with a plurality of client computing devices 804 through a network 806. For example, network 806 may be the Internet or other suitable communication network enabling communication between server computing device 802 and client computing devices 804. Server computing device 802 may include a website module 808 for providing one or more websites able to be accessed by browsers 810 on client computing devices 804.

Website module 808 may include a manipulable HIP component 812 for implementing the manipulable HIPs disclosed herein. For example, manipulable HIP component 812 may include a generation component 814 configured to generate manipulable HIPs, such as the 3-D objects 300, 500 described above, or other types of manipulable HIP objects. Manipulable HIP component 812 may further include a presentation component 816 for providing a manipulable HIP object for presentation in a user interface. As one example, the user interface may be included in a webpage downloaded to the browser 810 of a particular client computing device 804.

As discussed above, the manipulable HIP may be downloaded to and presented by the browser 810 in response to predetermined actions by an entity controlling the particular client computing device 804. For example an entity controlling the particular client computing device 804 may attempt to access services provided by website module 808, such as attempting to open an email account, attempting to access a certain webpage, a certain online location, or the like. In response, website module 808 may require that the entity acting in control of the particular client computing device 804 provide proof that the particular client computing device 804 is being controlled by a human and not an automated program.

Website module 808 implements presentation component 816 to compose a manipulable HIP generated by generation component 814 into a suitable presentation format and interface to manipulate the manipulable HIP and to send to the browser 810 of the particular client computing device 804. The user of the particular computing device 804 can then determine the solution to the manipulable HIP with one or more manipulations of the manipulable HIP and provide verification information in response. A verification component 818 of manipulable HIP component 812 is configured to receive the verification information and check the received verification information against the solution corresponding to the manipulable HIP that was downloaded to the particular client computing device 804. If the verification information provided by the particular client computing device 804 matches the corresponding solution, the particular client computing device 804 is permitted to proceed with the access to the services, or the like. On the other hand, if the verification information received does not match the solution, the access is denied and other action may be taken, such as providing the particular client computing device 804 with a different manipulable HIP to solve, or alternatively, terminating the connection, or other suitable action.

While the foregoing sets forth an example of a system in which the manipulable HIPs herein may be implemented, this is merely one example of a possible system, and implementations herein are not limited to any particular system configuration. The manipulable HIPs disclosed herein may be implemented in any suitable system or environment in which it is desirable to distinguish whether an actor is an actual human being or a computer program.

Server Computing Device

Figure 9:
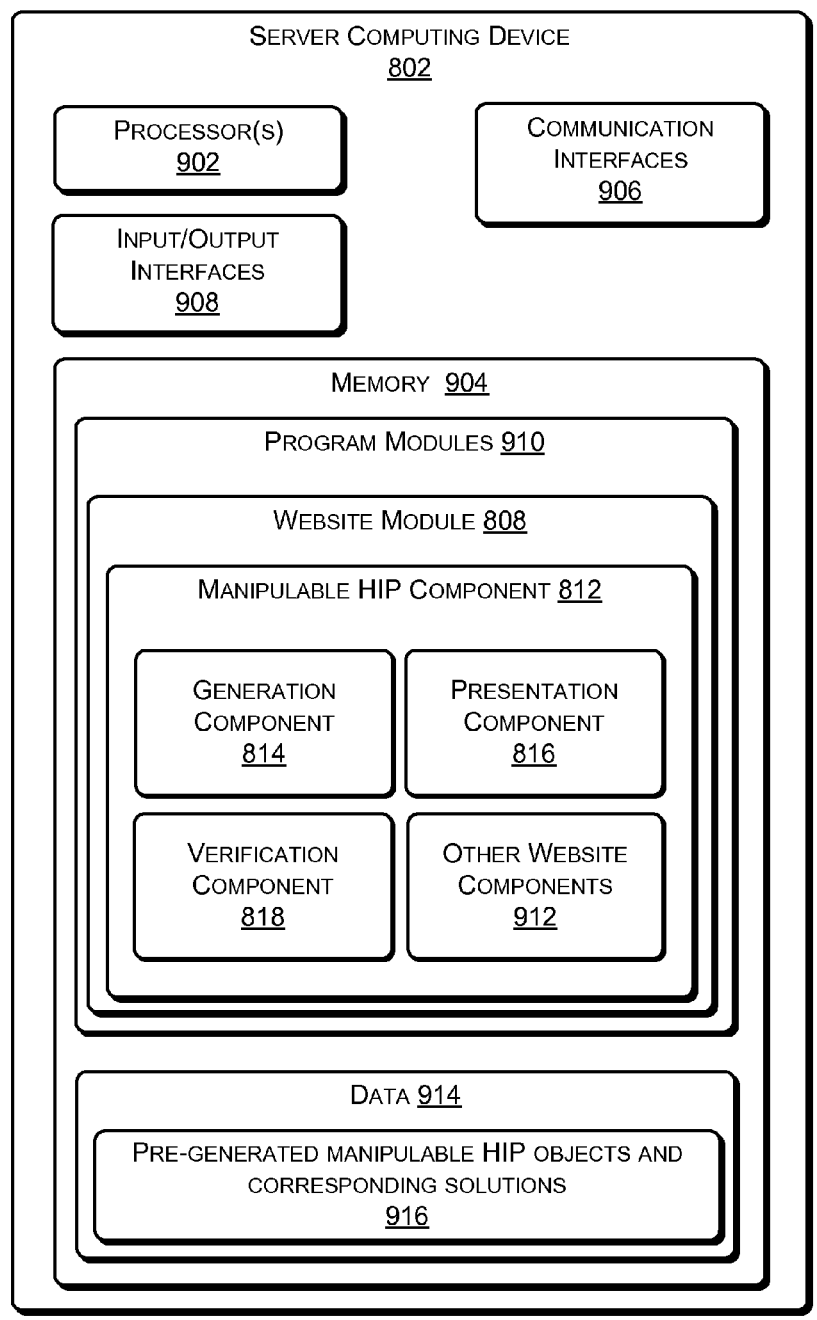
FIG. 9 is an example of a server computing device according to some implementations.

FIG. 9 illustrates an example of server computing device 802 that can be used to implement the components and modules for the manipulable HIPs described herein. In the illustrated example, server computing device 802 includes at least one processor 902 communicatively coupled to a memory 904, one or more communication interfaces 906, and one or more input/output interfaces 908. The processor 902 can be a single processing unit or a number of processing units, all of which may include multiple computing units or multiple cores. The processor 902 may be implemented as one or more microprocessors, microcomputers, microcontrollers, digital signal processors, central processing units, state machines, logic circuitries, and/or any devices that manipulate signals based on operational instructions. Among other capabilities, the processor 902 can be configured to fetch and execute computer-readable instructions stored in the memory 904 or other non-transitory computer-readable storage media.

The memory 904 can include any computer-readable storage media known in the art including, for example, volatile memory (e.g., RAM) and/or non-volatile memory (e.g., flash, etc.), mass storage devices, such as hard disk drives, solid state drives, removable media, including external drives, removable drives, floppy disks, optical disks (e.g., CD, DVD), storage arrays, storage area networks, network attached storage, or the like, or any combination thereof. The memory 904 stores computer-readable processor-executable program instructions as computer program code that can be executed by the processor 902 as a particular machine programmed for carrying out the processes and functions described according to the implementations herein.

The communication interfaces 906 facilitate communication between the server computing device 802 and the client computing devices 804. The communication interfaces 906 can facilitate communications within a wide variety of networks and protocol types, including wired networks (e.g., LAN, cable, etc.) and wireless networks (e.g., WLAN, cellular, satellite, etc.), the Internet and the like, any of which may correspond to the network 806. Communication interfaces 906 can also provide communication with external storage (not shown), such as in a storage array, network attached storage, storage area network, or the like. In some implementations, the server computing device 802 can receive communications from a client computing device 804 via the communication interfaces 906, and the server computing device 1102 can send communications back to the client computing device 804 via the communication interfaces 906.

Memory 904 includes a plurality of program modules 910 stored therein and executable by processors 902 for carrying out implementations herein. Program modules 910 include the website module 808 and the manipulable HIP component 812. Manipulable HIP component 812 includes the generation component 814, the presentation component 816, and the verification component 818, as discussed above. Website module 808 may also include a number of other website components 912 used for providing and supporting a website. Memory 904 may also include a number of other modules (not shown), such as an operating system, communication software, drivers, or the like.

Memory 904 also includes data 914 that may include pre-generated manipulable HIP objects and corresponding solutions 916. In some implementations, generation component 814 is executed by processor 902 to pre-generate a large number of manipulable HIP objects and corresponding solutions. When server computing device 802 receives an access request from a client computing device 804 requiring an HIP, processor 902 executes the presentation component 814 to present a manipulable HIP to the client computing device 804, as discussed above, by obtaining one of the pre-generate HIP objects and corresponding solutions 916. Alternatively, of course, the HIP objects and solutions may be generated dynamically in real time. Further, while an exemplary implementation of a server computing device architecture has been described, it will be appreciated that other implementations are not limited to the particular architecture described herein. For example, generation component 814 might be implemented on a separate computing device. Other variations will also be apparent to those of skill in the art in light of the disclosure herein.

Client Computing Device

Figure 10:
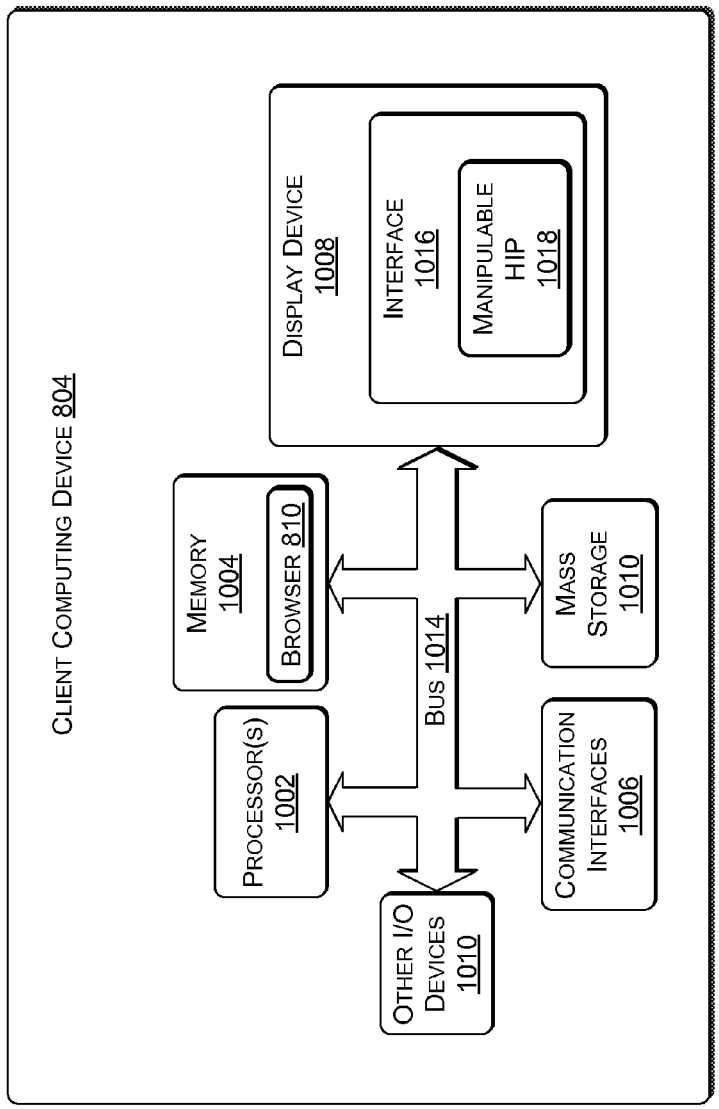
FIG. 10 is an example of a client computing device according to some implementations.

FIG. 10 illustrates an example configuration of a client computing device 804 that can be used for receiving and interacting with the manipulable HIPs described herein. The client computing device 804 may include at least one processor 1002, a memory 1004, communication interfaces 1006, a display device 1008, other input/output (I/O) devices 1010, and one or more mass storage devices 1012, all able to communicate through a system bus 1014 or other suitable connection.

The processor 1002 may be a single processing unit or a number of processing units, all of which may include single or multiple computing units or multiple cores. The processor 1002 can be implemented as one or more microprocessors, microcomputers, microcontrollers, digital signal processors, central processing units, state machines, logic circuitries, and/or any devices that manipulate signals based on operational instructions. Among other capabilities, the processor 1002 can be configured to fetch and execute computer-readable instructions or processor-accessible instructions stored in the memory 1004, mass storage devices 1012, or other computer-readable storage media.

Browser 810 described above may be maintained in memory 1004 and executed on processor 1002. Memory 1004 and mass storage devices 1012 are examples of computer-readable storage media for storing instructions which are executed by the processor 1002 to perform the various functions described above. For example, memory 1004 may generally include both volatile memory and non-volatile memory (e.g., RAM, ROM, or the like). Further, mass storage devices 1012 may generally include hard disk drives, solid-state drives, removable media, including external and removable drives, memory cards, Flash memory, floppy disks, optical disks (e.g., CD, DVD), or the like. Both memory 1004 and mass storage devices 1012 may be collectively referred to as memory or computer-readable storage media herein. Memory 1004 is capable of storing computer-readable, processor-executable program instructions as computer program code that can be executed on the processor 1002 as a particular machine configured for carrying out the operations and functions described in the implementations herein.

The client computing device 804 can also include one or more communication interfaces 1006 for exchanging data with other devices, such as via a network, direct connection, or the like, as discussed above. The communication interfaces 1006 can facilitate communications within a wide variety of networks and protocol types, including wired networks (e.g., LAN, cable, etc.) and wireless networks (e.g., WLAN, cellular, satellite, etc.), the Internet and the like.

A display device 1008, such as a monitor may be included in some implementations for displaying information to users. For example, display device 1008 can display an interface 1016 for presenting a manipulable HIP 1018 according to the implementations described herein. For example, interface 1016 may be generated by browser 810 in response to receiving downloaded information from server computing device 802. Other I/O devices 1010 may be devices that receive various inputs from a user and provide various outputs to the user, and can include a keyboard, remote controller, a mouse, audio input/output devices, and so forth. These other I/O devices 1010 may be used for manipulating the manipulable HIP 1018, as discussed above. Further, while an example client computing device configuration and architecture has been described, other implementations are not limited to the particular configuration and architecture described herein.

Server Side Process

Figure 11:
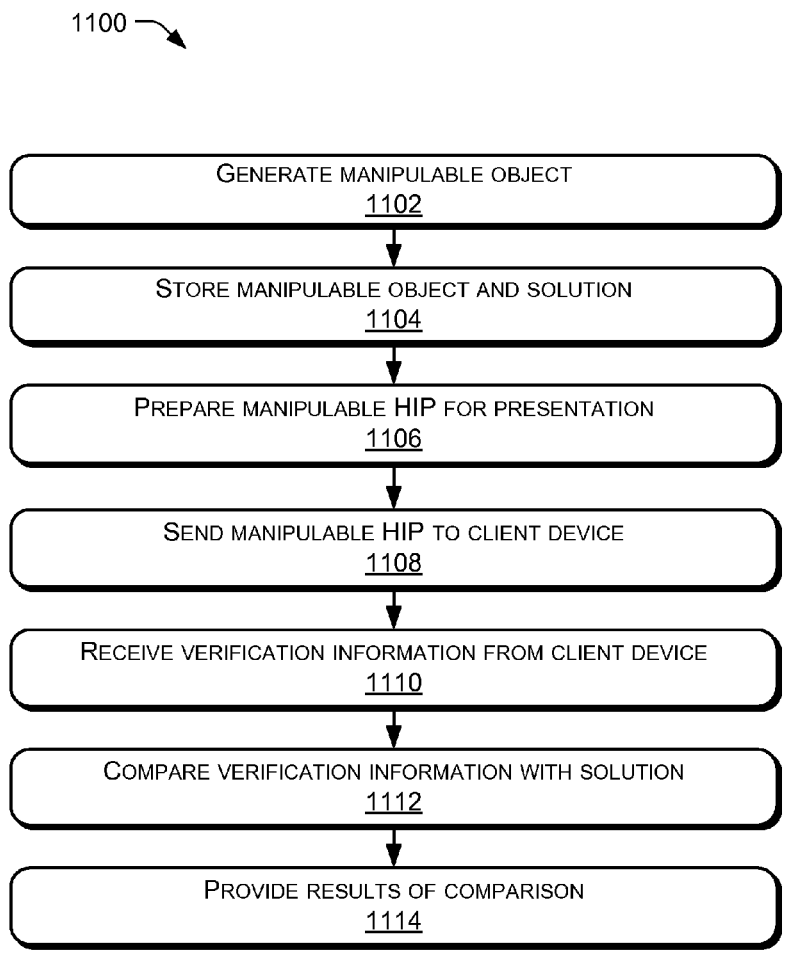
FIG. 11 is a flow diagram of an example server-side process for manipulable HIPs according to some implementations.

FIG. 11 is a flow diagram of an example process 1100 that may be carried out on the server side according to some implementations herein. In the flow diagram, the operations are summarized in individual blocks. The operations may be performed in hardware, or as processor-executable instructions (software or firmware) that may be executed by one or more processors. Further, the process 1100 may, but need not necessarily, be implemented using the system configurations of FIGS. 8 and 9 Consequently, by way of explanation, and not limitation, the process 1100 is described in the context of the systems of FIGS. 8 and 9.

At block 1102, a manipulable object is generated. In some implementations, the manipulable object may be a 3-D object generated using multiple 3-D characters. For example, a heap 3-D object or ordered 3-D object may be generated by combining a plurality of 3-D characters, such as letters, numbers, or the like. In other implementations, the manipulable object may be a group of images that may simulate a rotatable 3-D object. Other types of manipulable objects may also be generated, such as overlapping images that can be moved or combined to provide solution information.

At block 1104, the generated manipulable object may be stored and the corresponding solution may be stored as well. Thus, for some implementations, a number of 3-D objects are stored, along with the corresponding solutions. In other implementations, a plurality of images of 3-D objects taken from different angles may be obtained and stored with, or in place of, the 3-D objects themselves. For example, once the images of 3-D object from the various angles have been obtained there is no longer a need to retain the 3-D object itself. In other implementations, the images may be generated without ever generating an actual 3-D object. Other variations are also contemplated, and implementations are not limited to the particular manipulable HIP objects disclosed herein.

At block 1106, a manipulable HIP is prepared for presentation to an entity at a client computing device. For example, in response to an attempt by the entity to access services or the like on a website, the manipulable HIP may be prepared for determining whether the entity is a person or an automated computer program. In preparing the manipulable HIP, a manipulable HIP object and the corresponding solution are obtained.

At block 1108, the manipulable HIP is sent to the client computing device for presentation in a user interface. In some implementations, a 3-D object may be sent to the client computing device as a manipulable HIP object. In other implementations, a series of images of a 3-D object are sent as a manipulable HIP object. The images sent provide a sufficient number of different views of the 3-D object to simulate rotation or manipulation of the 3-D object.

At block 1110, verification information is received from the client computing device in response to the manipulable HIP that was sent to the client computing device. For example, a user at the client device manipulates the manipulable HIP object one or more times to gather information contained therein and returns the gathered information as the verification information.

At block 1112, the received verification information is compared with the solution corresponding to the manipulable HIP object that was downloaded to the client computing device.

At block 1114, a result of the comparison is provided for indicating whether the client computing device may be granted access to the services, webpage, or the like.

Example Client Side Process

Figure 12:
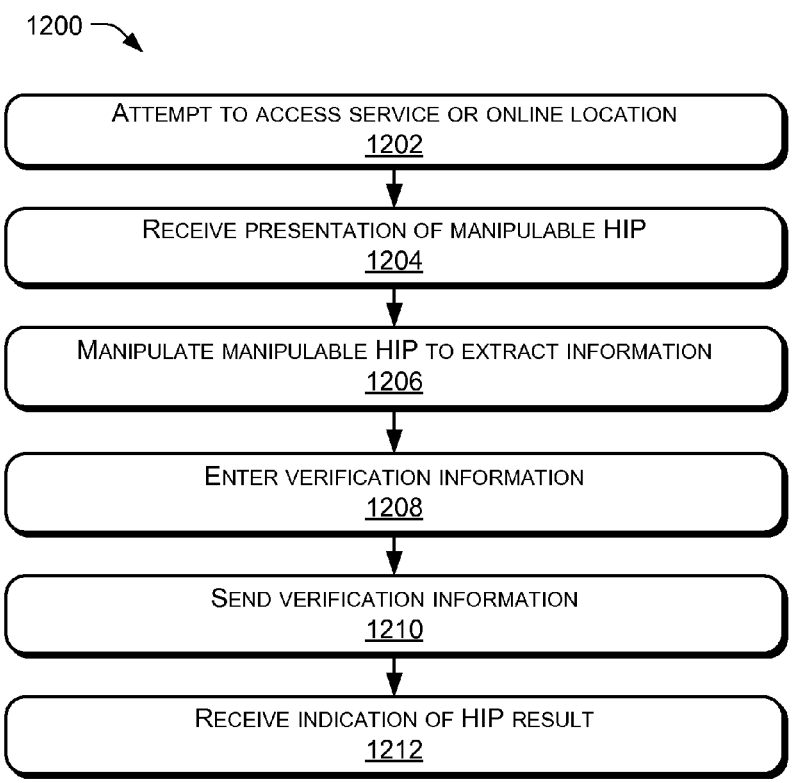
FIG. 12 is a flow diagram of an example client-side process for manipulable HIPs according to some implementations.

FIG. 12 is a flow diagram of an example process 1200 that may be carried out on the client side according to some implementations herein. In the flow diagram, the operations are summarized in individual blocks. The operations may be performed in hardware, or as processor-executable instructions (software or firmware) that may be executed by one or more processors. Further, the process 1200 may, but need not necessarily, be implemented using the system configurations of FIGS. 8 and 10. Consequently, by way of explanation, and not limitation, the process 1200 is described in the context of the system configurations of FIGS. 8 and 10.

At block 1202, an attempt is made to access services, a webpage, an online location, an online component, or the like. For example, a user may attempt to sign up for a free e-mail account, attempt to purchase event tickets, or access some other location on the Internet that requires verification that the user is a human and not a automated computer program or bot.

At block 1204, a manipulable HIP is presented to the user. For example, the web browser of the client computing device may download a webpage that includes an interface that presents the manipulable HIP to the user. The manipulable HIP made include a display of a manipulable HIP object. As mentioned above, the manipulable HIP object may include a group of images, may be a 3-D manipulable object, or the like.

At block 1206, the manipulable HIP object is manipulated by the user to extract useful information there from. For example, the user may rotate, move, translate, or otherwise manipulate the manipulable HIP object in the manipulable HIP for identifying one or more characters contained in the manipulable HIP object. This manipulation may be accomplished using a manipulation mechanism such as buttons provided in the user interface, a mouse pointer of the client computing device, a keyboard of the client computing device, or other mechanism.

At block 1208, verification information based on the extracted useful information is entered into the interface. For example, by manipulating the manipulable HIP object, the user is able to identify the one or more characters included in the manipulable HIP object and enter this information as verification information.

At block 1210, the verification information is sent from the client computing device to the server computing device in response to the manipulable HIP that was downloaded to the client computing device.

At block 1212, the user receives a result indicating whether the HIP test was passed or not. For example, the user is granted access to the services or Internet location when the HIP test is successfully passed. On the other hand, if the HIP test was not passed successfully, the access is denied, a second HIP test is presented to the user, or the like.

Example Environments

The example computing devices described herein are merely examples of suitable computing devices for some implementations and are not intended to suggest any limitation as to the scope of use or functionality of the architectures and frameworks that can implement the processes, components and features described herein. Neither should the computing devices described be interpreted as having any dependency or requirement relating to any one or combination of the components illustrated in the implementations herein. Thus, implementations herein are operational with numerous general purpose and special-purpose computing systems, environments or configurations, or other devices having processing capability.

Additionally, the components and modules herein can be employed in many different environments and situations, and are not limited to use in a website. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer-readable storage devices. Thus, the processes, components and modules described herein may be implemented by a computer program product. The computer program product may include computer-readable media having a computer-readable program code embodied therein. The computer-readable program code may be adapted to be executed by one or more processors to implement the processes, components and/or modules of the implementations described herein. The terms "computer-readable media," "processor-accessible media," or the like, refer to any kind of non-transitory machine-readable storage medium for retaining information, and can include the various kinds of storage devices discussed above.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described in connection with the implementations is included in at least one implementation, and the appearances of these phrases in various places in the specification are not necessarily all referring to the same implementation. Additionally, in the description, numerous specific details are set forth in order to provide a thorough disclosure. However, it will be apparent to one of ordinary skill in the art that these specific details may not all be utilized in all implementations. In other circumstances, well-known structures, materials, circuits, processes and interfaces have not been described in detail or are illustrated in block diagram form, so as to not unnecessarily obscure the disclosure.

Conclusion

Implementations described herein provide for manipulable HIPs that can be used to distinguish between a human and a computer program as a primary actor. According to some implementations, a user manipulates the manipulable HIPs one or more times to obtain verification information from the manipulable HIPs. The manipulable HIP schemes described herein may be used to pose a test that is easy for humans to solve, but difficult for automate computer programs.

Although the subject matter has been described in language specific to structural features and/or methodological acts, the subject matter defined in the appended claims is not limited to the specific features or acts described above. Rather, the specific features and acts described above are disclosed as example forms of implementing the claims This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A computing device comprising:
one or more hardware processors;
one or more computer-readable storage device storing instructions, which when executed by the one or more hardware processors, causes the one or more hardware processors to:
receive a manipulable object including a group of images arranged as a conglomeration of 3-D characters in contact with one another, the manipulable object being configured to rotate around an axis of rotation, the manipulable object formed by merging recognizable characters with one or more bogus characters;
display a first subset of information as part of a human interactive proof (HIP) in response to an attempt by a client to access one or more services;
display a second subset of information following one or more manipulations of the manipulable object, the first subset of information and the second subset of information comprising verification information of the client;
receive a user input corresponding to the verification information of the client; and
compare the user input with an interactive solution corresponding to the manipulable object for determining whether to grant the client access to the one or more services.

2. The computing device according to claim 1, wherein the 3-D characters are arranged with at least some of the 3-D characters having portions occluded by portions of adjacent 3-D characters of the manipulable object.

3. The computing device according to claim 1, wherein the 3-D characters are arranged in a predefined order along the axis of rotation.

4. The computing device according to claim 1, wherein the 3-D characters of the manipulable object further being configured according to at least one of the following:
one or more of the 3-D characters are using different fonts and different sizes;
one or more of the 3-D characters are warped;
one or more of the 3-D characters partially overlap or occlude an adjacent 3-D character;
one or more of the 3-D characters are rotated at an angle about a second axis perpendicular to the axis of rotation;
one or more of the 3-D characters are rotated at an angle about a third axis perpendicular to a plane consisting of the first and second axes of rotation;
one or more of the 3-D characters are positioned so that a center of gravity of the one or more 3-D characters is not at a same distance as centers of gravity of others of 3-D characters relative to the axis of rotation; or
lighting conditions of portions of one or more of the 3-D characters are varied from a lighting effect used on the other 3-D characters.

5. The computing device according to claim 1, wherein manipulation of the images visually simulates rotation of the manipulable object.

6. The computing device according to claim 1, wherein the one or more services include a website component used for providing and supporting a website.

7. A computer-implemented method comprising:
receiving, by a hardware processor, a manipulable object including a group of images arranged as a conglomeration of 3-D characters, the manipulable object being configured to rotate around multiple axes of rotation, the manipulable object formed by merging recognizable characters with one or more bogus characters;

providing, by the hardware processor, the manipulable object as a human interactive proof (HIP) for accessing to one or more services, the manipulable object being manipulable to display different portions of verification information of the client at different angles, the manipulable object having at least a first angle displaying a first portion of the verification information of the client for solving the HIP and a second angle displaying a second portion of the verification information of the client for solving the HIP; and comparing, by the hardware processor, a user input corresponding to the verification information of the client with an interactive solution corresponding to the manipulable object for determining whether to grant the access to one or more services.

8. The method according to claim 7, further comprising generating the manipulable object as an ordered plurality of 3-D characters.

9. The method according to claim 7, wherein the 3-D characters lie in a same plane.

10. The method according to claim 7, wherein the manipulable object further includes a group of images.

11. The method according to claim 7, wherein the 3-D characters are arranged in contact with one another according to a polyhedral shape.

12. A computer readable storage device storing instructions, which when executed by one or more hardware processors, cause the one or more hardware processors to perform operations comprising:

receiving a plurality of manipulable objects including a group of images arranged as a conglomeration of 3-D characters, the plurality of manipulable objects being configured to rotate around an axis of rotation, the plurality of manipulable objects formed by merging recognizable characters with one or more bogus characters;

displaying, in response to an attempt by a client to access one or more services, the plurality of manipulable objects, the plurality of manipulable objects displaying a first subset of information of the client, the plurality of manipulable objects being manipulable to reveal a second subset of information of the client when the plurality of manipulable objects are moved, the first subset of information and the second subset of information comprising verification information;

receiving a user input corresponding to the verification information; and comparing the user input with an interactive solution for determining whether to grant the client access to the one or more services.

13. The computer readable storage device according to claim 12, wherein the 3-D characters are arranged in contact with one another according to a polyhedral shape.

14. The computer readable storage device according to claim 12, wherein the plurality of manipulable objects are arranged to overlap according to a defined order.

15. The computer readable storage device according to claim 10, further comprising manipulating the plurality of manipulable objects using a manipulation mechanism provided in an interface presenting the plurality of manipulable objects on a browser.

16. The computing device according to claim 1, wherein the 3-D characters lie in a same plane.

17. The method according to claim 7, wherein the manipulable object has a third angle in which no portion of the verification information for solving the HIP is recognizable.

18. The method according to claim 7, wherein the 3-D characters of the manipulable object further being configured according to at least one of the following:

one or more of the 3-D characters are using different fonts and different sizes;

one or more of the 3-D characters are warped;

one or more of the 3-D characters partially overlap or occlude an adjacent 3-D character;

one or more of the 3-D characters are positioned so that a center of gravity of the one or more 3-D characters is not at a same distance as centers of gravity of others of 3-D characters relative to the multiple axes of rotation; or lighting conditions of portions of one or more of the 3-D characters are varied from a lighting effect used on the other 3-D characters.

19. The computer readable storage device according to claim 12, wherein the plurality of manipulates include at least one image.

* * * * *